(12) United States Patent
Motoki et al.

(10) Patent No.: US 8,747,511 B2
(45) Date of Patent: Jun. 10, 2014

(54) HONEYCOMB FILTER, AND MANUFACTURING METHOD OF THE SAME

(71) Applicant: NGK Insulators, Ltd., Nagoya (JP)

(72) Inventors: Koji Motoki, Nagoya (JP); Hiroyuki Suenobu, Nagoya (JP); Eriko Kodama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/764,009

(22) Filed: Feb. 11, 2013

(65) Prior Publication Data

US 2013/0145735 A1   Jun. 13, 2013

Related U.S. Application Data

(63) Continuation of application No. PCT/JP2012/075876, filed on Sep. 28, 2012.

(30) Foreign Application Priority Data

Sep. 29, 2011   (JP) ................................ 2011-214741

(51) Int. Cl.
| | |
|---|---|
| *B01D 39/00* | (2006.01) |
| *B01D 39/06* | (2006.01) |
| *B01D 24/00* | (2006.01) |
| *B01D 39/14* | (2006.01) |
| *B01D 50/00* | (2006.01) |

(52) U.S. Cl.
USPC .............. 55/523; 55/522; 55/524; 422/169; 422/170; 422/171; 422/172; 422/179; 422/180; 422/181; 422/182; 422/177; 422/178

(58) Field of Classification Search
USPC ............ 55/522–524; 422/169–172, 177–182
See application file for complete search history.

(56) References Cited

U.S. PATENT DOCUMENTS

| | | | |
|---|---|---|---|
| 4,595,662 A * | 6/1986 | Mochida et al. ................. 501/15 |
| 2002/0004445 A1 | 1/2002 | Beall et al. | |
| 2002/0042339 A1 | 4/2002 | Beall et al. | |
| 2004/0261384 A1 * | 12/2004 | Merkel et al. ................... 55/523 |
| 2007/0141301 A1 | 6/2007 | Boorom et al. | |
| 2008/0092499 A1 | 4/2008 | Otsuka et al. | |
| 2009/0137382 A1 | 5/2009 | Merkel | |
| 2010/0156010 A1 | 6/2010 | Merkel | |
| 2010/0230870 A1 | 9/2010 | Noguchi et al. | |

FOREIGN PATENT DOCUMENTS

| | | |
|---|---|---|
| EP | 2 107 046 A2 | 10/2009 |
| EP | 2 236 188 A1 | 10/2010 |
| EP | 2 236 189 A1 | 10/2010 |
| JP | 2003-534229 A1 | 11/2003 |

(Continued)

*Primary Examiner* — Amber Orlando
(74) *Attorney, Agent, or Firm* — Burr & Brown, PLLC

(57) ABSTRACT

A honeycomb filter includes a tubular honeycomb structure having porous partition walls with which there are formed a plurality of cells extending from one end surface to the other end surface to become through channels of a fluid; and plugged portions arranged in one open end portion of each of predetermined cells and the other open end portion of each of the remaining cells, porosities of the partition walls are 46% or less, a pore volume ratio of pores having pore diameters of 40 μm or more is 7.5% or less, and a pore volume ratio of pores having pore diameters of 10 μm or less is 25% or less, a permeability of the honeycomb structure is 0.8 μm² or more, and a coefficient of thermal expansion of the honeycomb structure in a range of 40 to 800° C. is $1.0 \times 10^{-6}$/° C. or less.

12 Claims, 6 Drawing Sheets

(56) References Cited

FOREIGN PATENT DOCUMENTS

| | | |
|---|---|---|
| JP | 2004-510676 A1 | 4/2004 |
| JP | 2009-520677 A1 | 5/2009 |
| JP | 2010-215447 A1 | 9/2010 |
| JP | 2010-221153 A1 | 10/2010 |
| JP | 2010-221154 A1 | 10/2010 |
| JP | 2010-260787 A1 | 11/2010 |
| JP | 2011-504869 A1 | 2/2011 |
| WO | 01/91882 A1 | 12/2001 |
| WO | 02/28803 A1 | 4/2002 |
| WO | 2006/030811 A1 | 3/2006 |
| WO | 2007/075333 A2 | 7/2007 |
| WO | 2009/070218 A2 | 6/2009 |

\* cited by examiner

HONEYCOMB FILTER, AND MANUFACTURING METHOD OF THE SAME

BACKGROUND OF THE INVENTION

1. Technical Field of the Invention

The present invention relates to a honeycomb filter, and a manufacturing method of the honeycomb filter. More particularly, the invention relates to a honeycomb filter which can increase a maximum amount of soot to be deposited and realize a high durability while suppressing increase of a pressure loss, and a manufacturing method of such a honeycomb filter.

2. Description of Related Art

An exhaust gas discharged from a diesel engine includes a particulate matter such as soot sometimes. When this particulate matter is released as it is to the atmosphere, an environmental pollution is caused sometimes. To remove the particulate matter from the exhaust gas, a filter for exhaust gas purification is used. Examples of the filter to remove the particulate matter from the exhaust gas discharged from the diesel engine can include a diesel particulate filter. In the present description, the particulate matter is referred to as "PM" sometimes. The PM is an abbreviation for "Particulate Matter". Moreover, the diesel particulate filter is abbreviated to "DPF" sometimes.

An example of such a DPF is a filter including a honeycomb structure having porous partition walls with which a plurality of cells are formed. The cells formed in the honeycomb structure become through channels of a fluid (e.g., the exhaust gas or a purified gas). Examples of a manufacturing method of such a honeycomb structure can include Patent Documents 1 and 2.

When the honeycomb structure is used as a filter such as the DPF, one of end portions of each cell formed in the honeycomb structure is provided with a plugged portion which plugs an open portion of the cell. When the exhaust gas is introduced through one end portion of such a filter, the particulate matter in the exhaust gas is collected by the partition walls.

PRIOR ART DOCUMENTS

Patent Documents

Patent Document 1: JP-A-2010-260787
Patent Document 2: WO 2006/030811

SUMMARY OF THE INVENTION

Problems to be Solved by the Invention

At present, in such a DPF, further enhancement of a durability is required as compared with a conventional filter. Specifically, there is required a DPF having a higher "maximum amount of soot to be deposited" than the conventional DPF. The maximum amount of the soot to be deposited is also referred to as "the soot mass limit" or "SML". The maximum amount of the soot to be deposited becomes an index of the durability of a honeycomb filter.

When the honeycomb filter is used as the above DPF, soot in an exhaust gas is deposited on partition walls of the honeycomb filter. When the soot is deposited on the partition walls of the honeycomb filter, a pressure loss of the honeycomb filter increases. To solve this problem, the soot deposited on the partition walls of the honeycomb filter is burnt to regenerate the honeycomb filter.

For example, from the viewpoint of an efficiency of the regeneration of the honeycomb filter, the above regeneration is preferably performed in a stage where a larger amount of the soot is deposited on the partition walls. On the other hand, when the amount of the soot to be deposited on the partition walls increases, a large amount of the soot is burnt at a time, and a temperature rise of the honeycomb filter at the regeneration increases. When the temperature rise of the honeycomb filter at the regeneration increases, damages such as cracks occur in the honeycomb filter sometimes. The maximum amount of the soot to be deposited is the maximum amount of the soot to be deposited at which damages such as the cracks do not occur in the honeycomb filter when the above regeneration is performed. That is, in the honeycomb filter, the high maximum amount of the soot to be deposited means that a durability such as a resistance to heat shock is excellent.

The maximum amount of the soot to be deposited in the honeycomb filter has a correlation with a heat capacity of the honeycomb filter. Moreover, the heat capacity of the honeycomb filter has a correlation with a porosity of the honeycomb filter. For example, the lower the porosity of the honeycomb filter is, the more a mass of the honeycomb filter increases. Moreover, the heat capacity of the honeycomb filter increases. However, when the porosity of the honeycomb filter is lowered, the pressure loss of the honeycomb filter increases. In particular, when the porosity of the honeycomb filter is 46% or less, the pressure loss noticeably increases. When the pressure loss of the honeycomb filter increases, a filter performance is deteriorated.

Heretofore, it has been considered that suppression of the increase of the pressure loss is inconsistent with enhancement of the durability and that it is remarkably difficult to achieve both of the suppression and the enhancement at the same time. In consequence, there has been prepared a honeycomb filter which is suitable for a use configuration while sacrificing one of the pressure loss and the durability.

For example, in the above Patent Document 1, control of particle size distributions of talc and silica in a cordierite raw material is executed. It is considered that in a manufactured porous honeycomb structure of Patent Document 1, a collecting efficiency is high and it is possible to prevent the increase of the pressure loss. In actual, however, it is remarkably difficult to control particle sizes of raw materials. In particular, it is difficult to decrease micro particle-diameter raw materials, and hence the problem of the pressure loss occurs in a low-porosity honeycomb filter.

Moreover, in the above Patent Document 2, there is disclosed a porous material in which a volume of pores having pore diameters of 15 µm or less is 0.07 cc/cc or less, and a volume of pores having pore diameters of 40 µm or more is 0.07 cc/cc or less. In this porous material, a porosity is from 40 to 75%, and a permeability is 1.5 $µm^2$ or more. However, the porous material is a non-oxidized ceramic material, and has the problem that a coefficient of thermal expansion is high. That is, in the raw material having a low coefficient of thermal expansion, a high durability cannot be realized while suppressing the increase of the pressure loss.

Furthermore, heretofore, as a method of lowering the porosities of the partition walls, there has been performed a method of increasing an amount of kaolin as a silica source and relatively decreasing an amount of silica in a cordierite forming raw material. In consequence, the porosities of the partition walls of the obtained honeycomb structure can be lowered. However, in such a method, pores extending from one surface to the other surface of each partition wall decrease owing to the decrease of the amount of silica, which causes the problem that the pressure loss of the honeycomb structure increases.

The present invention has been developed in view of the above-mentioned problems. According to the present invention, there are provided a honeycomb filter which can increase a maximum amount of soot to be deposited and realize a high durability while suppressing increase of a pressure loss, and a manufacturing method of such a honeycomb filter.

Means for Solving the Problem

According to the present invention, a honeycomb filter and a manufacturing method of the honeycomb filter are provided as follows.

[1] A honeycomb filter including a tubular honeycomb structure having porous partition walls with which there are formed a plurality of cells extending from one end surface to the other end surface to become through channels of a fluid; and plugged portions arranged in one open end portion of each of the predetermined cells and the other open end portion of each of the remaining cells, wherein porosities of the partition walls are 46% or less, a pore volume ratio of pores having pore diameters of 40 μm or more is 7.5% or less, and a pore volume ratio of pores having pore diameters of 10 μm or less is 25% or less, a permeability of the honeycomb structure is 0.8 μm$^2$ or more, and a coefficient of thermal expansion of the honeycomb structure in a range of 40 to 800° C. is $1.0 \times 10^{-6}$/° C. or less.

[2] The honeycomb filter according to the above [1], wherein the partition walls are made of a porous material containing cordierite as a main component, and the partition walls contain therein 0.40 mass % or less of lithium in terms of $Li_2O$.

[3] The honeycomb filter according to the above [1] or [2], wherein the partition walls contain therein at least one selected from the group consisting of cerium oxide, zirconium oxide and yttrium oxide, a content ratio of cerium oxide is 3.0 mass % or less, a content ratio of zirconium oxide is 2.5 mass % or less, and a content ratio of yttrium oxide is 2.0 mass % or less.

[4] The honeycomb filter according to any one of the above [1] to [3], which is prepared by using a kneaded material obtained by adding 1.0 part by mass or less of lithium carbonate to 100 parts by mass of a cordierite forming raw material.

[5] The honeycomb filter according to any one of the above [1] to [4], which is prepared by using a kneaded material obtained by adding, to a cordierite forming raw material, at least one selected from the group consisting of cerium oxide, zirconium oxide and yttrium oxide, wherein an amount of cerium oxide to be added to 100 parts by mass of the cordierite forming raw material is 3.0 parts by mass or less, an amount of zirconium oxide to be added to 100 parts by mass of the cordierite forming raw material is 2.5 parts by mass or less, and an amount of yttrium oxide to be added to 100 parts by mass of the cordierite forming raw material is 2.0 parts by mass or less.

[6] The honeycomb filter according to any one of the above [1] to [5], which is prepared by using a kneaded material obtained by using 2 mass % or more and 8 mass % or less of boehmite as an alumina source of a cordierite forming raw material.

[7] A manufacturing method of a honeycomb filter including a kneaded material preparing step of preparing a kneaded material containing a cordierite forming raw material; a formed honeycomb body preparing step of forming the kneaded material to obtain a formed honeycomb body; a honeycomb structure preparing step of firing the formed honeycomb body to obtain a honeycomb structure; and a plugging step of arranging plugged portions in one open end portion of each of predetermined cells of the honeycomb structure and the other open end portion of each of remaining cells, wherein the kneaded material preparing step includes at least one selected from the group consisting of: an operation of adding 0.2 part by mass or more and 1.0 part by mass or less of lithium carbonate to 100 parts by mass of the cordierite forming raw material; an operation of adding 3.0 parts by mass or less of cerium oxide to 100 parts by mass of the cordierite forming raw material; an operation of adding 2.5 parts by mass or less of zirconium oxide to 100 parts by mass of the cordierite forming raw material; an operation of adding 2.0 parts by mass or less of yttrium oxide to 100 parts by mass of the cordierite forming raw material; and an operation of using 2 mass % or more and 8 mass % or less of boehmite as an alumina source of the cordierite forming raw material.

[8] The manufacturing method of the honeycomb filter according to the above [7], wherein porosities of partition walls of the obtained honeycomb structure are 46% or less, a pore volume ratio of pores having pore diameters of 40 μm or more is 7.5% or less, and a pore volume ratio of pores having pore diameters of 10 μm or less is 25% or less, a permeability of the honeycomb structure is 0.8 μm$^2$ or more, and a coefficient of thermal expansion of the honeycomb structure in a range of 40 to 800° C. is $1.0 \times 10$/° C., or less.

A honeycomb filter of the present invention includes a honeycomb structure and plugged portions. The honeycomb structure is a tubular structure having porous partition walls with which there are formed a plurality of cells extending from one end surface to the other end surface to become through channels of a fluid. Moreover, the above plugged portions are arranged in one open end portion of each of the predetermined cells of this honeycomb structure and the other open end portion of each of the remaining cells. In the honeycomb filter of the present invention, porosities of the partition walls are 46% or less. Moreover, in the honeycomb filter of the present invention, a permeability of the honeycomb structure is 0.8 μm$^2$ or more. Furthermore, in the honeycomb filter of the present invention, a pore volume ratio of pores having pore diameters of 40 μm or more is 7.5% or less, and a pore volume ratio of pores having pore diameters of 10 μm or less is 25% or less. Additionally, in the honeycomb filter of the present invention, a coefficient of thermal expansion of the honeycomb structure in a range of 40 to 800° C. is $1.0 \times 10^{-6}$/° C. or less.

The honeycomb filter of the present invention can realize a high durability while suppressing increase of a pressure loss. That is, in the honeycomb filter of the present invention, the porosities of the partition walls are set to 46% or less, to realize the high durability. Moreover, in the honeycomb filter of the present invention, the permeability is set to 0.8 μm$^2$ or more, and the pore volume ratio of the pores having the pore diameters of 40 μm or more and the pore volume ratio of the pores having the pore diameters of 10 μm or less are set to the above-mentioned values, so that the pressure loss can be of the same degree as in a conventional honeycomb filter.

More specifically, in the honeycomb filter of the present invention, the pores which are not concerned with the gas permeability are selectively closed among the pores formed in the partition walls, thereby minimizing an influence on the increase of the pressure loss. Furthermore, when the pores which are not concerned with the gas permeability are selectively closed, the porosity of the honeycomb structure for use in the honeycomb filter lowers, and a heat capacity of the honeycomb filter increases. In consequence, the durability of the honeycomb filter can be enhanced, and a maximum amount of soot to be deposited can be increased.

In a manufacturing method of the honeycomb filter of the present invention, the above-mentioned honeycomb filter of the present invention can easily be manufactured. In the manufacturing method of the honeycomb filter of the present invention, in a step of preparing a kneaded material to prepare a honeycomb structure, at least one of five operations described as follows is performed. In consequence, among the pores formed in the partition walls, the pores which are not concerned with the gas permeability can selectively be closed. The first operation is an operation of adding 0.2 part by mass or more and 1.0 part by mass or less of lithium carbonate to 100 parts by mass of the cordierite forming raw material. The second operation is an operation of adding 3.0 parts by mass or less of cerium oxide to 100 parts by mass of the cordierite forming raw material. The third operation is an operation of adding 2.5 parts by mass or less of zirconium oxide to 100 parts by mass of the cordierite forming raw material. The fourth operation is an operation of adding 2.0 parts by mass or less of yttrium oxide to 100 parts by mass of the cordierite forming raw material. The fifth operation is an operation of using 2 mass % or more and 8 mass % or less of boehmite as an alumina source of the cordierite forming raw material.

DESCRIPTION OF THE INVENTION

Hereinafter, modes for carrying out the present invention will specifically be described with reference to the drawings. It should be understood that the present invention is not limited to the following embodiments and that modifications, improvements and the like suitably added to the following embodiments based on the ordinary knowledge of a person skilled in the art without departing from the scope of the present invention are also included in the scope of the present invention.

Figure 1:
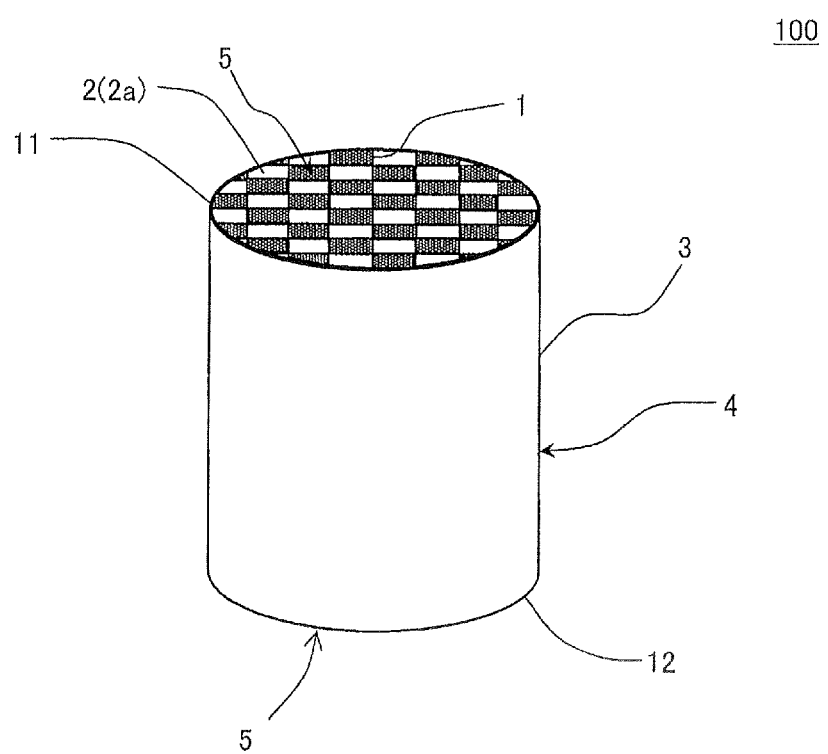
FIG. 1 is a perspective view schematically showing one embodiment of a honeycomb filter of the present invention.
Figure 2:
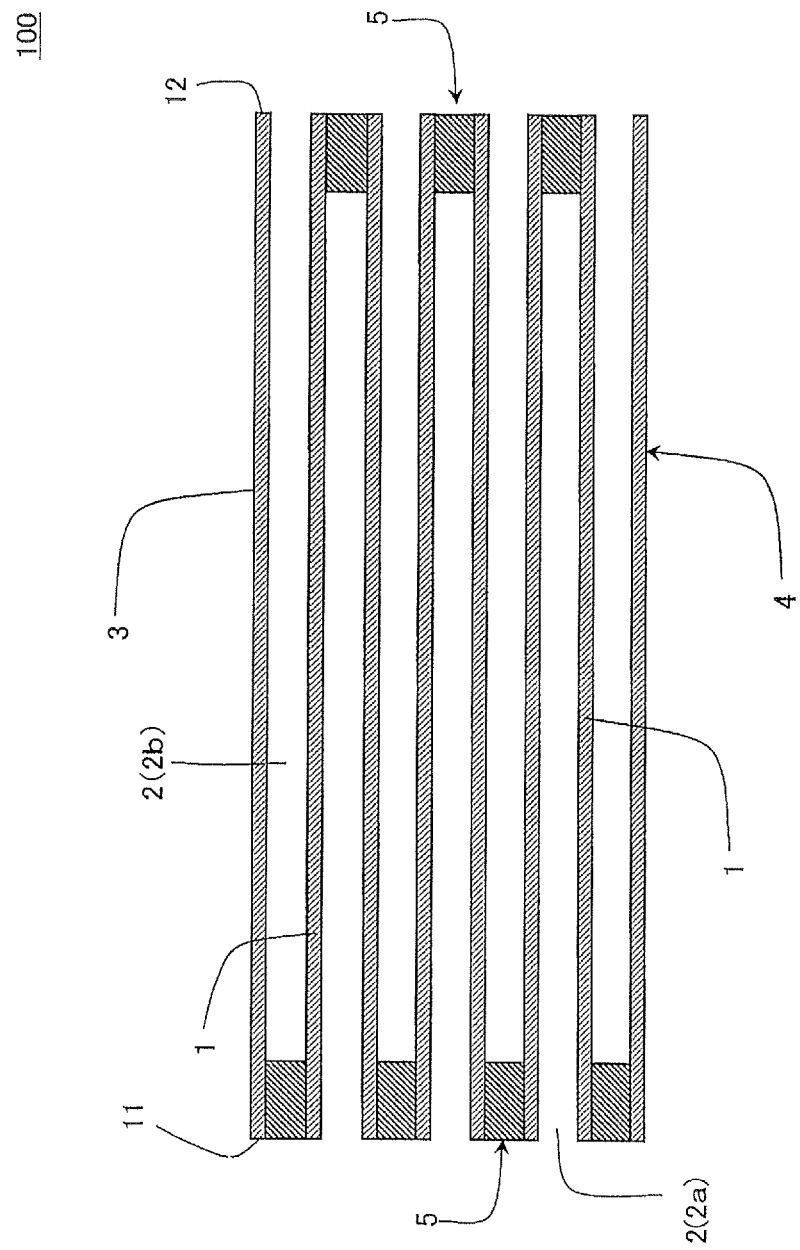
FIG. 2 is a sectional view schematically showing a cross section which is parallel to a cell extending direction in the one embodiment of the honeycomb filter of the present invention.

(1) Honeycomb Filter:

One embodiment of a honeycomb filter of the present invention will be described. As shown in FIG. 1 and FIG. 2, a honeycomb filter 100 of the present embodiment includes a honeycomb structure 4 and plugged portions 5. The honeycomb structure 4 is a tubular structure having porous partition walls 1 with which there are formed a plurality of cells 2 extending from one end surface 11 to the other end surface 12 to become through channels of a fluid. Moreover, the plugged portions 5 are arranged in one open end portion of each of the predetermined cells 2 of the honeycomb structure 4 and the other open end portion of each of the remaining cells 2. When an exhaust gas is introduced into one end portion of the honeycomb filter 100 of the present embodiment, a particulate matter in the exhaust gas is collected by the partition walls 1 of the honeycomb structure 4.

Here, FIG. 1 is a perspective view schematically showing the one embodiment of the honeycomb filter of the present invention. FIG. 2 is a sectional view schematically showing a cross section which is parallel to a cell extending direction in the one embodiment of the honeycomb filter of the present invention.

In the honeycomb filter 100 of the present embodiment, porosities of the partition walls 1 are 46% or less. Furthermore, in the honeycomb filter 100 of the present embodiment, a pore volume ratio of pores having pore diameters of 40 μm or more is 7.5% or less, and a pore volume ratio of pores having pore diameters of 10 μm or less is 25% or less. Moreover, in the honeycomb filter 100 of the present embodiment, a permeability of the honeycomb structure 4 is 0.8 μm$^2$ or more. Additionally, in the honeycomb filter 100 of the present embodiment, a coefficient of thermal expansion of the honeycomb structure 4 in a range of 40 to 800° C. is $1.0 \times 10^{-6}$/° C. or less.

When the honeycomb filter 100 which satisfies the above-mentioned constitution is obtained, it is possible to obtain the honeycomb filter which can increase a maximum amount of soot to be deposited and realize a high durability while suppressing increase of a pressure loss. More specifically, in the honeycomb filter 100 of the present embodiment, the pores which are not concerned with a gas permeability are selectively closed among the pores formed in the partition walls 1, thereby minimizing an influence on the increase of the pressure loss. Furthermore, when the pores which are not concerned with the gas permeability are selectively closed, the porosity of the honeycomb structure 4 lowers, and a heat capacity of the honeycomb filter 100 increases. In consequence, the durability of the honeycomb filter 100 can be enhanced, and the maximum amount of the soot to be deposited can be increased.

Also in a conventional honeycomb filter, an attempt has been made to lower the porosity of the honeycomb structure and enhance the durability. However, when the porosity of the honeycomb structure is simply lowered, the pressure loss of the honeycomb filter increases. Moreover, heretofore, to lower the porosity of the honeycomb structure, the pore diameters of the pores formed in the partition walls have also been made large. When the pore diameters are made large, the increase of the pressure loss can be suppressed, but a collecting efficiency of the honeycomb filter is remarkably deteriorated.

In the partition walls of the honeycomb structure, a large number of pores are formed. Also in a honeycomb structure used in the conventional honeycomb filter, a large number of pores are formed in partition walls. In these pores, two types of pores are present as follows. The first type of pores are pores which extend from one surface to the other surface of each of the partition walls to allow the exhaust gas to pass therethrough. The second type of pores are pores which do not extend from the one surface to the other surface of each of the partition walls and whose continuities are interrupted in the middles of the partition walls.

It can be considered that the pressure loss of the honeycomb filter is determined in accordance with the number of the above first type of pores. On the other hand, the above second type of pores do not have any influence on the pressure loss of the honeycomb filter. This second type of pores often have smaller pore diameters than the first type of pores. For the enhancement of the durability of the honeycomb filter, it is effective to lower the porosity of the honeycomb structure and increase a weight of the honeycomb structure. That is, when the above second type of pores can selectively be closed, the high durability can be realized while suppressing the increase of the pressure loss. In the honeycomb filter of the present embodiment, the constitution where the above second type of pores are selectively closed is regulated by the porosity, the permeability, the pore volume ratio of the pores having the pore diameters of 40 μm or more, and the pore volume ratio of the pores having the pore diameters of 10 μm or less. Hereinafter, the constitution where the above second type of pores are selectively closed will be described in more detail.

In the honeycomb filter of the present embodiment, the porosity is 46% or less, and the permeability is 0.8 μm² or more. Additionally, "the porosity" is a value measured by a mercury porosimeter. Moreover, "the permeability" means a physical property value calculated by the following equation (1). This permeability is a value which becomes an index indicating a passage resistance in a case where a predetermined gas passes through the partition walls and the like.

[Equation 1]

$$C = \frac{8FTV}{\pi D^2 (P^2 - 13.839^2)/13.839 \times 68947.6} \times 10^8 \quad (1)$$

Here, in the above equation (1), C is the permeability (μm²), F is a gas flow rate (cm³/s), T is a sample thickness (cm), V is a gas viscosity (dynes·sec/cm²), D is a sample diameter (cm), and P is a gas pressure (PSI), respectively. Moreover, numeric values in the above equation (1) are 13.839 (PSI)=1 (atm), and 68947.6 (dynes/cm²)=1 (PSI).

As described above, the permeability is the value which becomes the index indicating the passage resistance of each of the partition walls. When the porosities of the partition walls are 46% or less, the pore volume ratio of the pores having the pore diameters of 40 μm or more is 7.5% or less and the pore volume ratio of the pores having the pore diameters of 10 μm or less is 25% or less, the permeability of the honeycomb structure is 0.8 μm² or more. In this case, it can be considered that the above second type of pores are selectively closed. That is, it can be considered that in the honeycomb filter of the present embodiment, the pores each having the continuity interrupted in the middle of each partition wall and each having a small pore diameter are selectively closed.

For example, in a usual cordierite honeycomb structure, when the porosity is 46% or less, it is remarkably difficult to set the permeability to 0.8 μm² or more. Additionally, the pore diameters of the pores formed in the partition walls are made large, thereby making it possible to peculiarly increase the permeability. However, in such a case, the pore volume ratio of the pores having the pore diameters of 40 μm or more increases. When the pore volume ratio of the pores having the pore diameters of 40 μm or more increases, the collecting efficiency of the honeycomb filter is noticeably deteriorated.

For example, when the pore volume ratio of the pores having the pore diameters of 40 μm or more increases, the particulate matter which is a collecting object passes through the pores of the partition walls.

In the honeycomb filter of the present embodiment, since the pore volume ratio of the pores having the pore diameters of 40 μm or more is 7.5% or less, the permeability is not peculiarly increased by making large the pore diameters of the pores formed in the partition walls. That is, it can be considered that when all of "the porosity", "the permeability", "the pore volume ratio of the pores having the pore diameters of 40 μm or more" and "the pore volume ratio of the pores having the pore diameters of 10 μm or less" satisfy the above-mentioned numeric value ranges, the pores each having the continuity interrupted in the middle of each partition wall are suitably closed.

In the honeycomb filter of the present embodiment, the porosities of the partition walls are 46% or less. When the porosities of the partition walls are in excess of 46%, the heat capacity of the partition walls decreases, and it is difficult to maintain the high durability of the honeycomb filter. Therefore, the maximum amount of the soot to be deposited also decreases. In consequence, when the porosities of the partition walls are set to 46% or less in the honeycomb filter of the present embodiment, the maximum amount of the soot to be deposited can be increased.

Additionally, the porosities of the partition walls are preferably 42% or less, and further preferably 40% or less. According to such a constitution, the maximum amount of the soot to be deposited can further be increased.

There is not any special restriction on a lower limit value of the porosities of the partition walls, but the porosities of the partition walls are preferably 30% or more. When the porosities of the partition walls are excessively low, the pressure loss of the honeycomb filter increases sometimes. Additionally, the porosities of the partition walls are further preferably 34% or more.

Furthermore, in the honeycomb filter of the present embodiment, the permeability of the honeycomb structure is 0.8 μm² or more. According to such a constitution, even when the porosity is lowered, the passage resistances of the partition walls can be suitably set. The permeability of the honeycomb structure is preferably 1.0 μm² or more, and further preferably 1.2 μm² or more. According to such a constitution, even when the porosity is lowered, the increase of the pressure loss can effectively be suppressed.

There is not any special restriction on an upper limit value of the permeability of the honeycomb structure. The upper limit value of the permeability of the honeycomb structure also has a correlation with the porosities of the partition walls and the pore volume ratio of the pores having the pore diameters of 40 μm or more. That is, only when all the pores formed in the partition walls extend from the one surface to the other surface of each partition wall, the permeability of the honeycomb structure substantially has an upper limit. The upper limit value of the permeability of the honeycomb structure is about 6.0 μm².

Furthermore, in the honeycomb filter of the present embodiment, the pore volume ratio of the pores having the pore diameters of 40 μm or more is 7.5% or less. The pore volume ratio of the pores having the pore diameters of 40 μm or more is a value calculated from a measurement result of the mercury porosimeter. This "pore volume ratio of the pores having the pore diameters of 40 μm or more" means the ratio of the volume of the pores of 40 μm or more to the volume of all the pores. That is, "the pore volume ratio of the pores having the pore diameters of 40 µm or more" is the volume ratio of the pores of 40 µm or more, when the volume ratio of all the pores is 100%.

When the pore volume ratio of the pores having the pore diameters of 40 µm or more is in excess of 7.5%, the pores having excessively large pore diameters increase, and the collecting efficiency of the honeycomb filter deteriorates. That is, the particulate matter in the exhaust gas passes through the pores having large pore diameters, and it becomes difficult to collect the particulate matter.

The pore volume ratio of the pores having the pore diameters of 40 µm or more is preferably 6.0% or less, and further preferably 4.0% or less. According to such a constitution, the honeycomb filter having a suitable collecting efficiency can be obtained.

There is not any special restriction on a lower limit value of the pore volume ratio of the pores having the pore diameters of 40 µm or more. The substantial lower limit value of the pore volume ratio of the pores having the pore diameters of 40 µm or more is 0%. That is, in the honeycomb filter of the present embodiment, the pores having the pore diameters of 40 µm or more preferably are not substantially formed.

In the honeycomb filter of the present embodiment, the pore volume ratio of the pores having the pore diameters of 10 µm or less is 25% or less. The pore volume ratio of the pores having the pore diameters of 10 µm or less is a value calculated from the measurement result of the mercury porosimeter. This "pore volume ratio of the pores having the pore diameters of 10 µm or less" means the ratio of the volumes of the pores of 10 µm or less to the volumes of all the pores. That is, "the pore volume ratio of the pores having the pore diameters of 10 µm or less" is the volume ratio of the pores of 10 µm or less, when the volume ratio of all the pores is 100%. As described above, it is considered that the pores having the small pore diameters have an influence on the increase of the pressure loss of the honeycomb filter, and in the honeycomb filter of the present embodiment, the ratio of the pores having the small pore diameters is regulated by "the pore volume ratio of the pores having the pore diameters of 10 µm or less". When the pore volume ratio of the pores having the pore diameters of 10 µm or less is set to 25% or less, the ratio of the pores each having the continuity interrupted in the middle of each partition wall can relatively be decreased as compared with the honeycomb filter having the same porosity and having the pore volume ratio of the pores having the pore diameters of 10 µm or less in excess of 25%. Therefore, the honeycomb filter of the present embodiment can realize the high durability while suppressing the increase of the pressure loss.

In the honeycomb filter of the present embodiment, the pore volume ratio of the pores having the pore diameters of 10 µm or less is preferably 7.0% or less, and further preferably 6.0% or less. According to such a constitution, the heat capacity of the honeycomb filter can be increased while decreasing the influence of the honeycomb filter on the porosity. In consequence, the durability of the honeycomb filter can be enhanced, and the maximum amount of the soot to be deposited can be increased. Furthermore, when the pore volume ratio of the pores having the pore diameters of 10 µm or less decreases, the pressure loss can be decreased.

Moreover, in the honeycomb filter of the present embodiment, a coefficient of thermal expansion of the honeycomb structure in the range of 40 to 800° C. is $1.0 \times 10^{-6}/°$ C. or less. According to such a constitution, the honeycomb filter having an excellent thermal resistance can be obtained. The coefficient of thermal expansion of the honeycomb structure in the range of 40 to 800° C. is simply referred to as "the coefficient of thermal expansion of the honeycomb structure" sometimes. When "the coefficient of thermal expansion of the honeycomb structure" is mentioned in the present description, the coefficient means the coefficient of thermal expansion of the partition walls constituting the honeycomb structure, in the cell extending direction.

The coefficient of thermal expansion of the honeycomb structure is preferably $0.7 \times 10^{6}/°$ C. or less, and further preferably $0.4 \times 10^{-6}/°$ C. or less. According to such a constitution, the honeycomb filter of the present embodiment can suitably be used as a filter for purifying a high-temperature exhaust gas discharged from a diesel engine or the like.

There is not any special restriction on a lower limit value of the coefficient of thermal expansion of the honeycomb structure. That is, concerning the coefficient of thermal expansion, a preferable lower limit value is not present, and the coefficient is preferably a suitable lower value in accordance with a material of the honeycomb filter or the like. The lower limit value of the coefficient of thermal expansion of the honeycomb structure is, for example, $0.1 \times 10^{-6}/°$ C.

In the honeycomb filter of the present embodiment, the partition walls are preferably made of a porous material containing cordierite as a main component. In the present description, "the main component" means the component contained as much as 70 mass % or more in the constituent material. That is, in the honeycomb filter of the present embodiment, the partition walls of the honeycomb structure are preferably made of the porous material containing 70 mass % or more of cordierite. Moreover, the partition walls of the honeycomb structure are further preferably made of the material containing 75 mass % or more of cordierite, further preferably made of the material containing 80 mass % or more of cordierite, and especially preferably made of the material containing 85 mass % or more of cordierite. The cordierite is a suitable material for preparing the honeycomb structure which satisfies the numeric value ranges of "the porosity", "the permeability", "the pore volume ratio of the pores having the pore diameters of 40 µm or more" and "the pore volume ratio of the pores having the pore diameters of 10 µm or less" which have been described.

Furthermore, in the honeycomb filter of the present embodiment, the partition walls of the honeycomb structure contain therein 0.40 mass % or less of lithium in terms of $Li_2O$. When the partition walls contain therein 0.40 mass % or less of lithium in terms of $Li_2O$, the pores having small pore diameters are not easily formed in these partition walls. In consequence, the pores each having the continuity interrupted in the middle of each partition wall can be decreased, while maintaining the value of the permeability. When the amount of lithium in terms of $Li_2O$ to be contained in the partition walls is in excess of 0.40 mass %, a forming raw material is not sintered, and a structural strength required for the honeycomb filter cannot be acquired sometimes. The amount of lithium in terms of $Li_2O$ to be contained in the partition walls is further preferably 0.32 mass % or less.

The amount of lithium in terms of $Li_2O$ to be contained in the partition walls is preferably 0.08 mass % or more. When the amount in terms of $Li_2O$ is excessively small, the effect of decreasing the pores each having the continuity interrupted in the middle of each partition wall is not easily developed. To further develop the effect of decreasing the above-mentioned pores, the amount of lithium in terms of $Li_2O$ to be contained in the partition walls is further preferably 0.16 mass % or more.

In the honeycomb filter of the present embodiment, it is preferable to use the honeycomb structure prepared by using a kneaded material obtained by adding 1.0 part by mass or less of lithium carbonate to 100 parts by mass of a cordierite forming raw material. In such a honeycomb structure, the partition walls contain therein 0.40 mass % or less of lithium in terms of $Li_2O$. The amount of lithium carbonate to be added to 100 parts by mass of the cordierite forming raw material is further preferably 0.8 part by mass or less. Moreover, the amount of lithium carbonate to be added to 100 parts by mass of the cordierite forming raw material is preferably 0.2 part by mass or more, and further preferably 0.4 part by mass or more.

Moreover, in the honeycomb filter of the present embodiment, there may be used the honeycomb structure prepared by using the kneaded material obtained by using 2 mass % or more and 8 mass % or less of boehmite as an alumina source of the cordierite forming raw material. Also in such a honeycomb structure, the pores each having the continuity interrupted in the middle of each partition wall decrease.

There may be used the honeycomb structure prepared by using the kneaded material obtained both by adding lithium carbonate and by using boehmite. According to such a constitution, the pores each having the continuity interrupted in the middle of each partition wall can further be decreased.

Additionally, the cordierite forming raw material is a ceramic raw material blended so as to obtain a chemical composition which falls in ranges of 42 to 56 mass % of silica, 30 to 45 mass % of alumina and 12 to 16 mass % of magnesia. The cordierite forming raw material is fired to become cordierite.

Moreover, in the honeycomb filter of the present embodiment, the partition walls of the honeycomb structure contain therein at least one selected from the group consisting of cerium oxide, zirconium oxide and yttrium oxide at the following content ratio, which is one of suitable configurations. Additionally, as to the content ratio in the case where at least one selected from the above group is contained, the content ratio of cerium oxide ($CeO_2$) is 3.0 mass % or less, the content ratio of zirconium oxide ($ZrO_2$) is 2.5 mass % or less, and the content ratio of yttrium oxide ($Y_2O_3$) is 2.0 mass % or less. Such a honeycomb filter is preferably prepared, for example, by using the kneaded material obtained by adding at least one selected from the group consisting of cerium oxide, zirconium oxide and yttrium oxide to the cordierite forming raw material. Additionally, the amount of each of cerium oxide, zirconium oxide and yttrium oxide to be added to the cordierite forming raw material is as follows. The amount of cerium oxide to be added to 100 parts by mass of the cordierite forming raw material is 3.0 parts by mass or less. The amount of zirconium oxide to be added to 100 parts by mass of the cordierite forming raw material is 2.5 parts by mass or less. The amount of yttrium oxide to be added to 100 parts by mass of the cordierite forming raw material is 2.0 parts by mass or less.

Hereinafter, each constituent element of the honeycomb filter of the present embodiment will be described in more detail.

(1-1) Honeycomb Structure:

As shown in FIG. 1 and FIG. 2, the honeycomb structure 4 is the tubular structure having the porous partition walls 1 with which there are formed the plurality of cells 2 extending from the one end surface 11 to the other end surface 12 to become the through channels of the fluid. The honeycomb structure 4 shown in FIG. 1 and FIG. 2 further includes an outer peripheral wall 3 positioned in the outermost periphery. The porosity, the permeability, the pore volume ratio of the pores having the pore diameters of 40 μm or more and the coefficient of thermal expansion in the honeycomb structure 4 are as described above.

The partition walls of the honeycomb structure are provided with the pores. When the exhaust gas passes through the pores of the partition walls, the particulate matter in the exhaust gas is collected by these partition walls. That is, the partition walls provided with the pores become filter members in the honeycomb filter.

There is not any special restriction on a shape of the honeycomb structure. Examples of the shape can include a tubular shape in which end surfaces of the honeycomb structure are round, a tubular shape in which the above end surfaces are oval, and a tubular shape in which the above end surfaces are polygonal. Examples of the polygonal shape can include a quadrangular shape, a pentagonal shape, a hexagonal shape, a heptagonal shape, and an octagonal shape. FIG. 1 and FIG. 2 show an example where the shape of the honeycomb structure is the tubular shape in which the end surfaces are round.

Examples of shapes of the cells in a cross section which is orthogonal to the cell extending direction can include a quadrangular shape, a hexagonal shape, an octagonal shape, a round shape, and combinations of these shapes. In the quadrangular shape, a square shape or a rectangular shape is preferable.

(1-2) Plugged Portions:

As shown in FIG. 1 and FIG. 2, in the honeycomb filter 100 of the present embodiment, the plugged portions 5 are arranged in the open end portions of the cells 2 of the honeycomb structure 4. In this way, one of the open end portions of each of the cells 2 is plugged with the plugged portion 5 in the honeycomb filter 100 of the present embodiment. Hereinafter, the cell 2 including the plugged portion 5 disposed in the one open end portion is referred to as "the outflow cell 2b" sometimes. The cell 2 including the plugged portion 5 disposed in the other open end portion is referred to as "the inflow cell 2a" sometimes. Moreover, the one open end portion of each cell is each cell end portion on the side of the one end surface 11 of the honeycomb structure 4. The other open end portion of the cell is each cell end portion on the side of the other end surface 12 of the honeycomb structure 4.

The plugged portions 5 each having a constitution similar to that in a heretofore known honeycomb filter can suitably be used. Moreover, there is not any special restriction on positions where the plugged portions 5 are arranged. However, in the honeycomb filter 100 of the present embodiment, the inflow cells 2a and the outflow cells 2b are preferably alternately arranged via the partition walls 1. According to such a constitution, the particulate matter in the exhaust gas can suitably be collected by the partition walls.

There is not any special restriction on a material of the plugged portions. The material of the plugged portions may be the same as the material of the partition walls of the honeycomb structure. The material may be different from the material of the partition walls of the honeycomb structure.

(2) Manufacturing Method of Honeycomb Filter:

Next, one embodiment of a manufacturing method of a honeycomb filter of the present invention will be described. The manufacturing method of the honeycomb filter of the present embodiment is a manufacturing method for obtaining the one embodiment of the honeycomb filter of the present invention which has been described.

The manufacturing method of the honeycomb filter of the present embodiment includes a kneaded material preparing step, a formed honeycomb body preparing step, a honeycomb structure preparing step, and a plugging step. Especially in the kneaded material preparing step, it is important to prepare a kneaded material so that the following physical property values of the finally obtained honeycomb structure fall in predetermined numeric value ranges. Examples of the physical property values of the honeycomb structure to be obtained can include the porosities of the partition walls of the honeycomb structure, the permeability, the pore volume ratio of the pores having the pore diameters of 40 μm or more, the pore volume ratio of the pores having the pore diameters of 10 μm or less, and the coefficient of thermal expansion.

The kneaded material preparing step is a step of preparing the kneaded material containing the cordierite forming raw material. The formed honeycomb body preparing step is a step of forming the kneaded material obtained in the kneaded material preparing step, to obtain a formed honeycomb body. The honeycomb structure preparing step is a step of firing the formed honeycomb body obtained in the formed honeycomb body preparing step, to obtain a honeycomb structure. The plugging step is a step of arranging plugged portions in one open end portion of each of predetermined cells and the other open end portion of each of remaining cells in the honeycomb structure obtained in the honeycomb structure preparing step. By the above steps, it is possible to suitably manufacture the one embodiment of the honeycomb filter of the present invention which has been described.

In the manufacturing method of the honeycomb filter of the present embodiment, the kneaded material preparing step includes at least one of the following five operations. The first operation is an operation of adding 0.2 part by mass or more and 1.0 part by mass or less of lithium carbonate to 100 parts by mass of the cordierite forming raw material. The second operation is an operation of adding 3.0 parts by mass or less of cerium oxide to 100 parts by mass of the cordierite forming raw material. The third operation is an operation of adding 2.5 parts by mass or less of zirconium oxide to 100 parts by mass of the cordierite forming raw material. The fourth operation is an operation of adding 2.0 parts by mass or less of yttrium oxide to 100 parts by mass of the cordierite forming raw material. The fifth operation is an operation of using 2 mass % or more and 8 mass % or less of boehmite as an alumina source of the cordierite forming raw material. The above five operations may be combined and performed in the kneaded material preparing step. For example, the predetermined amount of lithium carbonate may be added to the cordierite forming raw material, and the predetermined amount of boehmite may be used as the alumina source of the cordierite forming raw material.

When the kneaded material preparing step includes at least one of the above five operations, the formation of the pores each having the continuity interrupted in the middle of each partition wall can be suppressed. In other words, the formation of the pores having the small pore diameters can be suppressed. In consequence, the formation of the pores which are not concerned with the gas permeability is suppressed, so that a low-porosity honeycomb structure can be prepared while maintaining the permeability. Hereinafter, each step of the manufacturing method of the honeycomb filter of the present embodiment will be described.

(2-1) Kneaded Material Preparing Step:

First, in the manufacturing method of the honeycomb filter of the present embodiment, the kneaded material containing the cordierite forming raw material is prepared. Specifically, forming raw materials including the cordierite forming raw material are mixed and kneaded to obtain the kneaded material. The cordierite forming raw material is a ceramic raw material blended so as to obtain a chemical composition which falls in ranges of 42 to 56 mass % of silica, 30 to 45 mass % of alumina and 12 to 16 mass % of magnesia. The cordierite forming raw material is fired to become cordierite.

Here, in the manufacturing method of the honeycomb filter of the present embodiment, 1.0 part by mass or less of lithium carbonate is preferably added to 100 parts by mass of the cordierite forming raw material to prepare the kneaded material. According to such a constitution, the formation of the pores which are not concerned with the gas permeability is suppressed, so that the low-porosity honeycomb structure can be prepared while maintaining the permeability. Additionally, when the amount of lithium carbonate to be added is in excess of 1.0 part by mass, the forming raw material is not sintered at the firing of the formed honeycomb body, and the structural strength required for the honeycomb filter cannot be acquired sometimes.

The amount of lithium carbonate to be added to 100 parts by mass of the cordierite forming raw material is preferably 0.2 part by mass or more. When the amount is smaller than 0.2 part by mass, the effect of suppressing the formation of the pores each having the interrupted continuity is not sufficiently developed sometimes. The amount of lithium carbonate to be added to 100 parts by mass of the cordierite forming raw material is preferably 0.2 part by mass or more and 1.0 part by mass or less, further preferably 0.2 part by mass or more and 0.8 part by mass or less, and further preferably 0.4 part by mass or more and 0.8 part by mass or less.

Moreover, in the manufacturing method of the honeycomb filter of the present embodiment, 3.0 parts by mass or less of cerium oxide may be added to 100 parts by mass of the cordierite forming raw material to prepare the kneaded material. Furthermore, 2.5 parts by mass or less of zirconium oxide may be added to 100 parts by mass of the cordierite forming raw material to prepare the kneaded material. Additionally, 2.0 parts by mass or less of yttrium oxide may be added to 100 parts by mass of the cordierite forming raw material to prepare the kneaded material. According to such a constitution, the formation of the pores which are not concerned with the gas permeability is suppressed, so that the low-porosity honeycomb structure can be prepared while maintaining the permeability.

Additionally, when the amount of cerium oxide to be added is in excess of 3.0 parts by mass, melting damages are generated at the firing of the formed honeycomb body, and the structural strength required for the honeycomb filter cannot be kept sometimes. Moreover, when the amount of zirconium oxide to be added is in excess of 2.5 parts by mass or the amount of yttrium oxide to be added is in excess of 2.0 parts by mass, similarly to the case of cerium oxide, the melting damages are generated at the firing of the formed honeycomb body, and the structural strength required for the honeycomb filter cannot be kept sometimes.

The amount of cerium oxide to be added to 100 parts by mass of the cordierite forming raw material is preferably 1.0 part by mass or more and 3.0 parts by mass or less, further preferably 1.5 parts by mass or more and 2.8 parts by mass or less, and further preferably 1.8 parts by mass or more and 2.5 parts by mass or less. Moreover, the amount of zirconium oxide to be added to 100 parts by mass of the cordierite forming raw material is preferably 0.5 part by mass or more and 2.4 parts by mass or less, further preferably 0.7 part by mass or more and 2.3 parts by mass or less, and further preferably 1.0 part by mass or more and 2.0 parts by mass or less. Furthermore, the amount of yttrium oxide to be added to 100 parts by mass of the cordierite forming raw material is preferably 0.3 part by mass or more and 1.8 parts by mass or less, further preferably 0.5 part by mass or more and 1.6 parts by mass or less, and further preferably 0.8 part by mass or more and 1.3 parts by mass or less.

Moreover, in the manufacturing method of the honeycomb filter of the present embodiment, 2 mass % or more and 8 mass % or less of boehmite may be used as the alumina source of the cordierite forming raw material. That is, cordierite is a ceramic material containing predetermined amounts of silica, alumina and magnesia, and in the cordierite forming raw material, materials which become a silica source, the alumina source and a magnesia source are used. In the kneaded material preparing step, boehmite is used as the alumina source of the cordierite forming raw material. In this case, the amount of boehmite to the whole cordierite forming raw material is 2 mass % or more and 8 mass % or less. According to such a constitution, the formation of the pores which are not concerned with the gas permeability is suppressed, so that the low-porosity honeycomb structure can be prepared while maintaining the permeability. When the amount of boehmite is smaller than 2 mass % or in excess of 8 mass %, the effect of suppressing the formation of the pores each having the interrupted continuity owing to the addition of boehmite is not developed.

There is not any special restriction on the amount of boehmite as long as the amount is 2 mass % or more and 8 mass % or less.

A dispersion medium may be added to the above cordierite forming raw material to prepare the kneaded material. As the dispersion medium, water can be used. An amount of the dispersion medium to be added to 100 parts by mass of the cordierite forming raw material is preferably from 20 to 50 parts by mass.

An organic binder may be added to the cordierite forming raw material. The organic binder is preferably methylcellulose, hydroxypropyl methylcellulose, hydroxypropyl ethyl cellulose, hydroxyethyl cellulose, carboxymethylcellulose, polyvinyl alcohol, or any combination of these binders. Moreover, an amount of the organic binder to be added to 100 parts by mass of the cordierite forming raw material is preferably from 1 to 10 parts by mass. Furthermore, an inorganic binder may be added to the cordierite forming raw material. As the inorganic binder, inorganic fiber, colloid oxide, clay or the like can be used.

Moreover, a surfactant may be added to the cordierite forming raw material. As the surfactant, ethylene glycol, dextrin, fatty acid soap, polyalcohol or the like can be used. As to these surfactants, one type may be used alone, or two types or more may be combined and used. An amount of the surfactant to be added to 100 parts by mass of the cordierite forming raw material is preferably from 0 to 5.0 parts by mass.

Among raw materials for use in the cordierite forming raw material, an average particle diameter of raw material particles of talc and silica is preferably 5 μm or more and 35 μm or less. When the average particle diameter of the raw material particles of talc and silica is excessively small, the pores which are not concerned with the gas permeability increase sometimes. On the other hand, when the average particle diameter of the raw material particles is excessively large, a large number of pores having the pore diameters of 40 μm or more are formed sometimes. The average particle diameter of the raw material particles of talc and silica is further preferably 5 μm or more and 30 pin or less, and especially preferably 10 μm or more and 30 μm or less. The above average particle diameter is a median diameter (d50) in a particle diameter distribution of each type of raw material particles.

There is not any special restriction on a method of kneading the forming raw material to form the kneaded material, and an example of the method is a method using a kneader, a vacuum clay kneader or the like.

(2-2) Formed Honeycomb Body Preparing Step:

Next, the obtained kneaded material is formed into a honeycomb shape to obtain the formed honeycomb body. There is not any special restriction on a method of forming the kneaded material to obtain the formed honeycomb body. An example of the method of obtaining the formed honeycomb body is a known forming method such as extrusion forming or injection forming. A suitable example of the method is a method of extruding the material by use of a die having a desirable cell shape, partition wall thickness and cell density to obtain the formed honeycomb body. As a material of the die, a hard metal which does not easily wear is preferable.

There is not any special restriction on a shape of the formed honeycomb body, and a preferable shape is a cylindrical shape, a tubular shape in which end surfaces have an elliptic shape, a polygonal tubular shape in which end surfaces have "a square, rectangular, triangular, pentangular, hexagonal or octagonal shape or the like", or the like.

(2-3) Honeycomb Structure Preparing Step:

Next, the obtained formed honeycomb body is fired, to obtain the honeycomb structure including porous partition walls with which a plurality of cells to become through channels of a fluid are formed. Prior to firing the formed honeycomb body, the formed honeycomb body may be dried.

There is not any special restriction on a drying method. Examples of the drying method can include hot air drying, microwave drying, dielectric drying, reduced-pressure drying, vacuum drying, and freeze-drying. Above all, the dielectric drying, the microwave drying or the hot air drying is preferably performed alone or as any combination thereof.

Prior to firing the formed honeycomb body, this formed honeycomb body is preferably calcinated. The calcination is performed for degreasing. The calcination is not restricted as long as at least part of an organic matter in the formed honeycomb body can be removed. In general, a burning temperature of the organic binder is about 100 to 300° C. Therefore, as calcinating conditions, heating is preferably performed in an oxidizing atmosphere at a temperature of about 200 to 1000° C. for about ten to 100 hours.

The formed honeycomb body is fired to sinter and densify the forming raw material constituting the calcinated formed body. According to such firing, the partition walls obtain a predetermined strength. Firing conditions can more suitably be selected in accordance with a type of the forming raw material. That is, suitable conditions of firing temperature, firing time, firing atmosphere and the like may be selected in accordance with the type of the forming raw material. In the manufacturing method of the honeycomb filter of the present embodiment, since the cordierite forming raw material is used, the firing temperature is preferably from 1350 to 1440° C. Moreover, as the firing time, a time to keep the highest temperature is preferably from three to ten hours. There is not any special restriction on a device which performs the calcinating and firing. Examples of the device which performs the calcinating and firing can include an electric furnace and a gas furnace.

When the firing is performed, lithium carbonate or boehmite contained in the kneaded material acts, so that the formation of the pores which are not concerned with the gas permeability is suppressed. In consequence, it is possible to prepare the honeycomb structure which can be used in the one embodiment of the honeycomb filter of the present invention.

(2-4) Plugging Step:

Next, plugged portions are arranged in one open end portion of each of predetermined cells of the honeycomb structure and the other open end portion of each of the remaining cells. The plugging step can be performed in conformity to the step similar to the plugging step of a manufacturing method of a heretofore known honeycomb filter.

An example of a method of arranging the plugged portions is a method of filling, with a slurry-like plugging material, the one open end portion of each of the predetermined cells of the honeycomb structure and the other open end portion of each of the remaining cells. When the open end portions of the cells of the honeycomb structure are filled with the plugging material, first the one open end portion is filled with the plugging material, and then the other open end portion is filled with the plugging material.

An example of a method of filling the one open end portion with the plugging material is the following method. First, a sheet is attached to one end surface of the honeycomb structure. Next, holes to be filled with the plugging material are made in this sheet. The holes to be filled with the plugging material correspond to positions where the cells to be provided with the plugged portions are present. The honeycomb structure having the attached sheet is placed under pressure into a container in which the plugging material is contained. That is, the end portion of the honeycomb structure to which the sheet has been attached is placed under pressure into the above container. In consequence, the predetermined cells are filled with the plugging material through the sheet holes.

After filling the one open end portion of each predetermined cell with the plugging material, the other open end portion of each remaining cell is filled with the plugging material by a method similar to the method which has been described. That is, a sheet is also attached to the other end surface of the honeycomb structure similarly to the one end surface, and the cells are filled with the plugging material by a method similar to the above method.

The plugging material filled into the cells of the honeycomb structure is dried, so that the plugged portions can be formed. Additionally, the plugging material may be dried every open end portion.

EXAMPLES

Hereinafter, examples of the present invention will further specifically be described, but the present invention is not limited to these examples.

Example 1

First, a honeycomb structure for use in a honeycomb filter was prepared. As a ceramic raw material to prepare the honeycomb structure, a cordierite forming raw material was used. A dispersion medium, an inorganic binder, an organic binder and a dispersant were added to the cordierite forming raw material, to prepare a kneaded material to be formed. An amount of the dispersion medium to be added to 100 parts by mass of the cordierite forming raw material was 35 parts by mass. An amount of the inorganic binder to be added to 100 parts by mass of the cordierite forming raw material was 2 parts by mass. An amount of the organic binder to be added to 100 parts by mass of the cordierite forming raw material was 4 parts by mass.

As the cordierite forming raw material, a material containing 43.0 mass % of talc, 17.0 mass % of kaolin, 12.0 mass % of silica, 24.0 mass % of alumina and 2.0 mass % of boehmite was used. An average particle diameter of talc was 20 μm. An average particle diameter of silica was 20 μm. An average particle diameter of boehmite was 0.1 μm. The above average particle diameter is a median diameter (d50) in a particle diameter distribution of each type of raw material particles. A blend prescription of the cordierite forming raw material is shown in Table 1 and Table 2. Moreover, raw materials used in preparing the kneaded material in Example 1 are shown as "raw material batch 1".

TABLE 1

| | Raw material batch | Ave. particle dia. of talc (μm) | Ave. particle dia. of silica (μm) | Blend of talc (mass %) | Blend of inorganic binder (mass %) | Blend of kaolin (mass %) | Blend of silica (mass %) | Blend of alumina (mass %) | Blend of boehmite (mass %) |
|---|---|---|---|---|---|---|---|---|---|
| Example 1 | 1 | 20 | 20 | 43.0 | 2.0 | 17.0 | 12.0 | 24.0 | 2.0 |
| Example 2 | 2 | 20 | 20 | 43.0 | 2.0 | 9.0 | 17.0 | 23.0 | 6.0 |
| Example 3 | 3 | 20 | 20 | 43.0 | 2.0 | 9.0 | 17.0 | 21.0 | 8.0 |
| Example 4 | 4 | 20 | 20 | 43.0 | 2.0 | 17.0 | 12.0 | 26.0 | 0.0 |
| Example 5 | 5 | 20 | 20 | 43.0 | 2.0 | 17.0 | 12.0 | 26.0 | 0.0 |
| Example 6 | 6 | 20 | 20 | 43.0 | 2.0 | 17.0 | 12.0 | 26.0 | 0.0 |
| Example 7 | 7 | 20 | 20 | 43.0 | 2.0 | 9.0 | 17.0 | 29.0 | 0.0 |
| Example 8 | 8 | 20 | 20 | 43.0 | 2.0 | 9.0 | 17.0 | 29.0 | 0.0 |
| Example 9 | 9 | 20 | 20 | 43.0 | 2.0 | 9.0 | 17.0 | 29.0 | 0.0 |
| Example 10 | 10 | 20 | 20 | 43.0 | 2.0 | 9.0 | 17.0 | 26.0 | 3.0 |
| Example 11 | 11 | 20 | 20 | 43.0 | 2.0 | 17.0 | 12.0 | 26.0 | 0.0 |
| Example 12 | 12 | 20 | 20 | 43.0 | 2.0 | 17.0 | 12.0 | 26.0 | 0.0 |
| Example 13 | 13 | 20 | 20 | 43.0 | 2.0 | 17.0 | 12.0 | 26.0 | 0.0 |
| Example 14 | 14 | 20 | 20 | 43.0 | 2.0 | 17.0 | 12.0 | 26.0 | 0.0 |
| Example 15 | 15 | 20 | 20 | 43.0 | 2.0 | 17.0 | 12.0 | 26.0 | 0.0 |
| Example 16 | 16 | 20 | 20 | 43.0 | 2.0 | 17.0 | 12.0 | 26.0 | 0.0 |
| Example 17 | 17 | 20 | 20 | 43.0 | 2.0 | 17.0 | 12.0 | 26.0 | 0.0 |

TABLE 2

| | Raw material batch | Cordierite forming raw material (parts by mass) | Addition of $Li_2CO_3$ (parts by mass) | Addition of $CeO_2$ (parts by mass) | Addition of $ZrO_2$ (parts by mass) | Addition of $Y_2O_3$ (parts by mass) | Content of $Li_2O$ (%) | Content of $CeO_2$ (%) | Content of $ZrO_2$ (%) | Content of $Y_2O_3$ (%) |
|---|---|---|---|---|---|---|---|---|---|---|
| Example 1 | 1 | 100 | — | — | — | — | — | — | — | — |
| Example 2 | 2 | 100 | — | — | — | — | — | — | — | — |
| Example 3 | 3 | 100 | — | — | — | — | — | — | — | — |
| Example 4 | 4 | 100 | 0.2 | — | — | — | 0.08 | — | — | — |
| Example 5 | 5 | 100 | 0.4 | — | — | — | 0.16 | — | — | — |
| Example 6 | 6 | 100 | 0.8 | — | — | — | 0.32 | — | — | — |
| Example 7 | 7 | 100 | 0.4 | — | — | — | 0.16 | — | — | — |

TABLE 2-continued

| | Raw material batch | Cordierite forming raw material (parts by mass) | Addition of Li$_2$CO$_3$ (parts by mass) | Addition of CeO$_2$ (parts by mass) | Addition of ZrO$_2$ (parts by mass) | Addition of Y$_2$O$_3$ (parts by mass) | Content of Li$_2$O (%) | Content of CeO$_2$ (%) | Content of ZrO$_2$ (%) | Content of Y$_2$O$_3$ (%) |
|---|---|---|---|---|---|---|---|---|---|---|
| Example 8 | 8 | 100 | 0.8 | — | — | — | 0.32 | — | — | — |
| Example 9 | 9 | 100 | 1.0 | — | — | — | 0.40 | — | — | — |
| Example 10 | 10 | 100 | 0.4 | — | — | — | 0.16 | — | — | — |
| Example 11 | 11 | 100 | — | 1.0 | — | — | — | 1.0 | — | — |
| Example 12 | 12 | 100 | — | 3.0 | — | — | — | 3.0 | — | — |
| Example 13 | 13 | 100 | — | — | 1.0 | — | — | — | 1.0 | — |
| Example 14 | 14 | 100 | — | — | 2.0 | — | — | — | 2.0 | — |
| Example 15 | 15 | 100 | — | — | 2.5 | — | — | — | 2.5 | — |
| Example 16 | 16 | 100 | — | — | — | 1.0 | — | — | — | 1.0 |
| Example 17 | 17 | 100 | — | — | — | 2.0 | — | — | — | 2.0 |

As the dispersion medium for the preparation of the kneaded material, water was used. Moreover, as the inorganic binder, clay was used. Additionally, as the inorganic binder, colloid oxide, inorganic fiber or the like can be used besides the above-mentioned clay. As the organic binder, hydroxypropyl methylcellulose and methylcellulose were used. As the dispersant, potassium laurate soap was used.

Next, the obtained kneaded material was extruded by using a die to obtain a formed honeycomb body. In this way, the formed honeycomb body was prepared. Moreover, the formed honeycomb body was dried by a microwave drier. Both end surfaces of the dried formed honeycomb body were cut into predetermined dimensions. Afterward, the formed honeycomb body was further dried by a hot air drier.

The dried formed honeycomb body was fired at 1425° C. for seven hours. In this way, a honeycomb structure was prepared. The obtained honeycomb structure had a cylindrical shape in which end surfaces were round. A diameter of each end surface of the honeycomb structure was 144 mm. A length of the honeycomb structure in a cell extending direction was 152 mm. A partition wall thickness of the honeycomb structure was 304.8 μm. A cell density of the honeycomb structure was 46.5 cells/cm$^2$.

A porosity of the honeycomb structure was 45%. The porosity is a value measured by "AutoPore IV 9500 (trade name)" manufactured by Micromeritics Co.

Next, a honeycomb filter was manufactured by using the obtained honeycomb structure. Specifically, in cells of the honeycomb structure, plugged portions were arranged so that one open end portion and the other open end portion of the adjacent cells were alternately closed.

Moreover, in the obtained honeycomb filter, a permeability of the honeycomb structure was 1.1 μm$^2$. Furthermore, in the honeycomb structure, a pore volume ratio of pores having pore diameters of 40 μm or more was 5.8%. Additionally, in the honeycomb structure, a pore volume ratio of pores having pore diameters of 10 μm or less was 18.5%. The pore volume ratio of the pores having the pore diameters of 40 μm or more and the pore volume ratio of the pores having the pore diameters of 10 μm or less were values calculated from pore volumes measured by "AutoPore IV 9500 (trade name)" manufactured by Micromeritics Co. Moreover, a coefficient of thermal expansion of the honeycomb structure in a range of 40 to 800° C. was 0.5×10$^{-6}$/° C. Respective measurement results are shown in Table 3. The above coefficient of thermal expansion is a value obtained by measuring a coefficient of thermal expansion of partition walls constituting the honeycomb structure in the cell extending direction.

TABLE 3

| | Porosity (%) | Permeability (μm$^2$) | Pore volume ratio of pores having pore diameters of 10 μm or less (%) | Pore volume ratio of pores having pore diameters of 40 μm or more (%) | Coefficient of thermal expansion (10$^{-6}$/° C.) | Max. amount of soot to be deposited (g/L) | Pressure loss (kPa) | Collecting efficiency (%) |
|---|---|---|---|---|---|---|---|---|
| Example 1 | 45 | 1.1 | 18.5 | 5.8 | 0.5 | 5.4 | 7.6 | 93 |
| Example 2 | 46 | 1.4 | 17.0 | 6.3 | 0.5 | 5.2 | 7.3 | 92 |
| Example 3 | 40 | 0.9 | 24.5 | 6.1 | 0.4 | 6.5 | 8.2 | 91 |
| Example 4 | 45 | 1.2 | 14.0 | 6.0 | 0.5 | 5.3 | 7.5 | 93 |
| Example 5 | 42 | 1.0 | 7.7 | 6.5 | 0.6 | 6.0 | 8.0 | 91 |
| Example 6 | 37 | 0.8 | 4.6 | 7.1 | 0.7 | 7.2 | 8.7 | 93 |
| Example 7 | 46 | 1.5 | 5.3 | 7.0 | 0.7 | 5.1 | 7.1 | 91 |
| Example 8 | 40 | 1.1 | 2.3 | 7.3 | 0.7 | 6.6 | 7.8 | 90 |
| Example 9 | 36 | 0.9 | 1.1 | 7.4 | 0.8 | 7.3 | 8.3 | 92 |
| Example 10 | 39 | 0.9 | 8.9 | 6.3 | 0.5 | 6.8 | 8.1 | 93 |
| Example 11 | 40 | 1.1 | 16.0 | 5.8 | 0.6 | 6.2 | 7.2 | 93 |
| Example 12 | 38 | 1.1 | 7.0 | 7.3 | 0.6 | 6.7 | 7.0 | 91 |
| Example 13 | 42 | 1.2 | 8.0 | 5.0 | 0.5 | 6.0 | 7.5 | 94 |
| Example 14 | 38 | 1.1 | 2.2 | 7.0 | 0.5 | 6.7 | 7.2 | 92 |
| Example 15 | 35 | 1.0 | 1.5 | 7.4 | 0.5 | 7.1 | 7.0 | 91 |
| Example 16 | 41 | 1.2 | 16.0 | 5.7 | 0.6 | 6.4 | 7.3 | 93 |
| Example 17 | 39 | 1.0 | 5.0 | 6.2 | 0.6 | 6.7 | 7.1 | 92 |

Next, as to the obtained honeycomb filter, "a maximum amount of soot to be deposited", "a pressure loss" and "a collecting efficiency" were evaluated by the following methods. Results are shown in Table 3.

[Maximum Amount of Soot to be Deposited]

An exhaust gas including soot as a particulate matter was purified by using the honeycomb filters of the respective examples and comparative examples. To regenerate the honeycomb filter, the soot deposited on the partition walls of the honeycomb structure was burnt. Successively, the amount of the soot to be deposited was increased, to confirm the limit amount of the soot to be deposited at which cracks were generated in the honeycomb filter. In the evaluation of the maximum amount of the soot to be deposited, 5.0 g/L or more was passable.

A specific measuring method of the maximum amount of the soot to be deposited was as follows. First, a non-thermally expandable mat made of a ceramic material was wound as a holding material around the outer periphery of the honeycomb filter. In this state, the honeycomb filter was pushed into a can member for canning which was made of stainless steel, and fixed thereto. Afterward, a burning gas including the soot, which was generated by burning a diesel fuel, was allowed to flow into one end surface of the honeycomb filter and flow out of the other end surface. In consequence, the soot in the exhaust gas was deposited in the honeycomb filter. Moreover, the honeycomb filter was once cooled to 25° C., and the burning gas of 680° C. was allowed to flow into the one end surface of the honeycomb filter, to burn the soot. When the pressure loss of the honeycomb filter was decreased by the above burning, a flow rate of the burning gas was decreased. In consequence, the soot deposited on the partition walls was rapidly burnt. Afterward, it was confirmed whether or not the cracks were generated in the honeycomb filter. The amount of the soot to be deposited was increased until the generation of the cracks was recognized, and the above test was repeatedly performed. The amount (g/L) of the soot deposited at the generation of the cracks was obtained as a value of the maximum amount of the soot to be deposited.

[Pressure Loss]

First, the honeycomb filter as a measuring object was allowed to collect 4 g/L of the soot. In this state, the gas was allowed to flow at a flow rate of 2.27 Nm$^3$/min, and pressures were measured on an inlet side and an outlet side of the honeycomb filter. A pressure difference between the pressure on the inlet side and the pressure on the outlet side was the pressure loss (kPa). In evaluation of the pressure loss, a value which was smaller than 9.0 kPa was passable.

[Collecting Efficiency]

The number of particulate matters to be discharged from an exhaust system of a diesel engine was measured, when the honeycomb filter of each example or each comparative example was disposed in the above exhaust system and when any honeycomb filters were not disposed. From the obtained measurement values, collecting efficiencies (%) of the honeycomb filters of the respective examples and comparative examples were obtained. In the evaluation of the collecting efficiency, a value of 90% or more was passable.

Example 2

A honeycomb structure was prepared by a method similar to Example 1, except that raw materials used in preparing a kneaded material were changed to "raw material batch 2" shown in Table 1 and Table 2. A honeycomb filter was manufactured by using the obtained honeycomb structure. In Example 2, an amount of talc was 43.0 mass %, an amount of kaolin was 9.0 mass %, an amount of silica was 17.0 mass %, an amount of alumina was 23.0 mass %, and an amount of boehmite was 6.0 mass %.

Example 3

A honeycomb structure was prepared by a method similar to Example 1, except that raw materials used in preparing a kneaded material were changed to "raw material batch 3" shown in Table 1 and Table 2. A honeycomb filter was manufactured by using the obtained honeycomb structure. In Example 3, an amount of talc was 43.0 mass %, an amount of kaolin was 9.0 mass %, an amount of silica was 17.0 mass %, an amount of alumina was 21.0 mass %, and an amount of boehmite was 8.0 mass %.

Example 4

A honeycomb structure was prepared by a method similar to Example 1, except that raw materials used in preparing a kneaded material were changed to "raw material batch 4" shown in Table 1 and Table 2. A honeycomb filter was manufactured by using the obtained honeycomb structure. In Example 4, an amount of talc was 43.0 mass %, an amount of kaolin was 17.0 mass %, an amount of silica was 12.0 mass %, and an amount of alumina was 26.0 mass %. Moreover, in Example 4, boehmite was not used in a cordierite forming raw material, and 0.2 part by mass of lithium carbonate ($Li_2CO_3$) was added to 100 parts by mass of the cordierite forming raw material.

Example 5

A honeycomb structure was prepared by a method similar to Example 4, except that 0.4 part by mass of lithium carbonate was added to 100 parts by mass of a cordierite forming raw material to prepare a kneaded material (raw material batch 5). A honeycomb filter was manufactured by using the obtained honeycomb structure.

Example 6

A honeycomb structure was prepared by a method similar to Example 4, except that 0.8 part by mass of lithium carbonate was added to 100 parts by mass of a cordierite forming raw material to prepare a kneaded material (raw material batch 6). A honeycomb filter was manufactured by using the obtained honeycomb structure.

Example 7

A honeycomb structure was prepared by a method similar to Example 1, except that raw materials used in preparing a kneaded material were changed to "raw material batch 7" shown in Table 1 and Table 2. A honeycomb filter was manufactured by using the obtained honeycomb structure. In Example 7, an amount of talc was 43.0 mass %, an amount of kaolin was 9.0 mass %, an amount of silica was 17.0 mass %, and an amount of alumina was 29.0 mass %. Moreover, in Example 7, boehmite was not used in a cordierite forming raw material, and 0.4 part by mass of lithium carbonate was added to 100 parts by mass of the cordierite forming raw material.

Example 8

A honeycomb structure was prepared by a method similar to Example 1, except that raw materials used in preparing a kneaded material were changed to "raw material batch 8" shown in Table 1 and Table 2. A honeycomb filter was manufactured by using the obtained honeycomb structure. In Example 8, an amount of talc was 43.0 mass %, an amount of kaolin was 9.0 mass %, an amount of silica was 17.0 mass %, and an amount of alumina was 29.0 mass %. Moreover, in Example 8, boehmite was not used in a cordierite forming raw material, and 0.8 part by mass of lithium carbonate was added to 100 parts by mass of the cordierite forming raw material.

Example 9

A honeycomb structure was prepared by a method similar to Example 1, except that raw materials used in preparing a kneaded material were changed to "raw material batch 9" shown in Table 1 and Table 2. A honeycomb filter was manufactured by using the obtained honeycomb structure. In Example 9, an amount of talc was 43.0 mass %, an amount of kaolin was 9.0 mass %, an amount of silica was 17.0 mass %, and an amount of alumina was 29.0 mass %. Moreover, in Example 9, boehmite was not used in a cordierite forming raw material, and 1.0 part by mass of lithium carbonate was added to 100 parts by mass of the cordierite forming raw material.

Example 10

A honeycomb structure was prepared by a method similar to Example 1, except that raw materials used in preparing a kneaded material were changed to "raw material batch 10" shown in Table 1 and Table 2. A honeycomb filter was manufactured by using the obtained honeycomb structure. In Example 10, an amount of talc was 43.0 mass %, an amount of kaolin was 9.0 mass %, an amount of silica was 17.0 mass %, an amount of alumina was 26.0 mass %, and an amount of boehmite was 3.0 mass %. Moreover, in Example 10, 0.4 part by mass of lithium carbonate was added to 100 parts by mass of a cordierite forming raw material.

Examples 11 to 17

Honeycomb structures were prepared by a method similar to Example 1, except that raw materials used in preparing kneaded materials were changed to "raw material batches 11 to 17" shown in Table 1 and Table 2. Honeycomb filters were manufactured by using the obtained honeycomb structures. In Examples 11 to 17, an amount of talc was 43.0 mass %, an amount of kaolin was 17.0 mass %, an amount of silica was 12.0 mass %, and an amount of alumina was 26.0 mass %. Moreover, in Example 11, 1.0 part by mass of cerium oxide ($CeO_2$) was added to 100 parts by mass of a cordierite forming raw material. In Example 12, 3.0 parts by mass of cerium oxide ($CeO_2$) was added to 100 parts by mass of the cordierite forming raw material. In Example 13, 1.0 part by mass of zirconium oxide ($ZrO_2$) was added to 100 parts by mass of the cordierite forming raw material. In Example 14, 2.0 parts by mass of zirconium oxide ($ZrO_2$) was added to 100 parts by mass of the cordierite forming raw material. In Example 15, 2.5 parts by mass of zirconium oxide ($ZrO_2$) was added to 100 parts by mass of the cordierite forming raw material. In Example 16, 1.0 part by mass of yttrium oxide ($Y_2O_3$) was added to 100 parts by mass of the cordierite forming raw material. In Example 17, 2.0 parts by mass of yttrium oxide ($Y_2O_3$) was added to 100 parts by mass of the cordierite forming raw material.

Comparative Examples 1 to 13

Honeycomb structures were prepared by a method similar to Example 1, except that raw materials used in preparing kneaded materials were changed to "raw material batches 18 to 30" shown in Table 4 and Table 5. Honeycomb filters were manufactured by using the obtained honeycomb structures.

Also as to the honeycomb filters of Examples 2 to 17 and Comparative Examples 1 to 13, "a maximum amount of soot to be deposited", "a pressure loss" and "a collecting efficiency" were evaluated by a method similar to Example 1. Results are shown in Table 3 and Table 6. Additionally, in Comparative Example 9, it was not possible to maintain a shape of a formed honeycomb body at firing. Therefore, "the maximum amount of the soot to be deposited", "the pressure loss" and "the collecting efficiency" were not evaluated.

TABLE 4

|  | Raw material batch | Ave. particle dia. of talc (μm) | Ave. particle dia. of silica (μm) | Blend of talc (mass %) | Blend of inorganic binder (mass %) | Blend of kaolin (mass %) | Blend of silica (mass %) | Blend of alumina (mass %) | Blend of boehmite (mass %) |
|---|---|---|---|---|---|---|---|---|---|
| Comparative Example 1 | 18 | 20 | 20 | 43.0 | 2.0 | 30.0 | 7.0 | 18.0 | 0.0 |
| Comparative Example 2 | 19 | 20 | 40 | 43.0 | 2.0 | 30.0 | 7.0 | 18.0 | 0.0 |
| Comparative Example 3 | 20 | 40 | 20 | 43.0 | 2.0 | 30.0 | 7.0 | 18.0 | 0.0 |
| Comparative Example 4 | 21 | 20 | 20 | 43.0 | 2.0 | 17.0 | 12.0 | 26.0 | 0.0 |
| Comparative Example 5 | 22 | 20 | 20 | 43.0 | 2.0 | 17.0 | 12.0 | 25.0 | 1.0 |
| Comparative Example 6 | 23 | 20 | 20 | 43.0 | 2.0 | 17.0 | 12.0 | 26.0 | 0.0 |
| Comparative Example 7 | 24 | 20 | 20 | 43.0 | 2.0 | 9.0 | 17.0 | 29.0 | 0.0 |
| Comparative Example 8 | 25 | 20 | 20 | 43.0 | 2.0 | 9.0 | 17.0 | 20.0 | 9.0 |
| Comparative Example 9 | 26 | 20 | 20 | 43.0 | 2.0 | 9.0 | 17.0 | 29.0 | 0.0 |
| Comparative Example 10 | 27 | 20 | 20 | 43.0 | 2.0 | 9.0 | 17.0 | 27.5 | 1.5 |
| Comparative Example 11 | 28 | 20 | 20 | 43.0 | 2.0 | 17.0 | 12.0 | 26.0 | 0.0 |

TABLE 4-continued

|  | Raw material batch | Ave. particle dia. of talc (μm) | Ave. particle dia. of silica (μm) | Blend of talc (mass %) | Blend of inorganic binder (mass %) | Blend of kaolin (mass %) | Blend of silica (mass %) | Blend of alumina (mass %) | Blend of boehmite (mass %) |
|---|---|---|---|---|---|---|---|---|---|
| Comparative Example 12 | 29 | 20 | 20 | 43.0 | 2.0 | 17.0 | 12.0 | 26.0 | 0.0 |
| Comparative Example 13 | 30 | 20 | 20 | 43.0 | 2.0 | 17.0 | 12.0 | 26.0 | 0.0 |

TABLE 5

|  | Raw material batch | Cordierite forming raw material (parts by mass) | Addition of $Li_2CO_3$ (parts by mass) | Addition of $CeO_2$ (parts by mass) | Addition of $ZrO_2$ (parts by mass) | Addition of $Y_2O_3$ (parts by mass) | Content of $Li_2O$ (%) | Content of $CeO_2$ (%) | Content of $ZrO_2$ (%) | Content of $Y_2O_3$ (%) |
|---|---|---|---|---|---|---|---|---|---|---|
| Comparative Example 1 | 18 | 100 | — | — | — | — | — | — | — | — |
| Comparative Example 2 | 19 | 100 | — | — | — | — | — | — | — | — |
| Comparative Example 3 | 20 | 100 | — | — | — | — | — | — | — | — |
| Comparative Example 4 | 21 | 100 | — | — | — | — | — | — | — | — |
| Comparative Example 5 | 22 | 100 | — | — | — | — | — | — | — | — |
| Comparative Example 6 | 23 | 100 | 0.1 | — | — | — | 0.04 | — | — | — |
| Comparative Example 7 | 24 | 100 | — | — | — | — | — | — | — | — |
| Comparative Example 8 | 25 | 100 | — | — | — | — | — | — | — | — |
| Comparative Example 9 | 26 | 100 | 1.2 | — | — | — | — | — | — | — |
| Comparative Example 10 | 27 | 100 | — | — | — | — | — | — | — | — |
| Comparative Example 11 | 28 | 100 | — | 3.2 | — | — | — | 3.2 | — | — |
| Comparative Example 12 | 29 | 100 | — | — | 2.7 | — | — | — | 2.7 | — |
| Comparative Example 13 | 30 | 100 | — | — | — | 2.2 | — | — | — | 2.2 |

TABLE 6

|  | Porosity (%) | Permeability (μm$^2$) | Pore volume ratio of pores having pore diameters of 10 μm or less (%) | Pore volume ratio of pores having pore diameters of 40 μm or more (%) | Coefficient of thermal expansion (10$^{-6}$/° C.) | Max. amount of soot to be deposited (g/L) | Pressure loss (kPa) | Collecting efficiency (%) |
|---|---|---|---|---|---|---|---|---|
| Comparative Example 1 | 45 | 0.6 | 36.0 | 5.6 | 0.5 | 5.6 | 9.4 | 94 |
| Comparative Example 2 | 44 | 1.0 | 18.0 | 9.1 | 0.4 | 9.1 | 8.1 | 84 |
| Comparative Example 3 | 45 | 0.9 | 26.0 | 8.7 | 0.6 | 8.7 | 8.3 | 87 |
| Comparative Example 4 | 48 | 1.4 | 27.0 | 5.3 | 0.6 | 5.3 | 7.2 | 94 |
| Comparative Example 5 | 47 | 1.2 | 28.0 | 5.6 | 0.5 | 5.6 | 7.6 | 93 |
| Comparative Example 6 | 47 | 1.3 | 18.0 | 5.8 | 0.5 | 5.8 | 7.4 | 91 |
| Comparative Example 7 | 51 | 1.7 | 8.0 | 5.6 | 0.6 | 5.6 | 6.8 | 91 |
| Comparative Example 8 | 38 | 0.7 | 32.0 | 6.3 | 0.4 | 6.3 | 9.1 | 93 |
| Comparative Example 9 | — | — | — | — | — | — | — | — |
| Comparative Example 10 | 48 | 1.5 | 12.0 | 5.8 | 0.5 | 5.8 | 7.0 | 92 |
| Comparative Example 11 | 35 | 0.7 | 6.1 | 7.9 | 0.8 | 7.1 | 8.0 | 91 |

TABLE 6-continued

|  | Porosity (%) | Permeability ($\mu m^2$) | Pore volume ratio of pores having pore diameters of 10 μm or less (%) | Pore volume ratio of pores having pore diameters of 40 μm or more (%) | Coefficient of thermal expansion ($10^{-6}/°C$) | Max. amount of soot to be deposited (g/L) | Pressure loss (kPa) | Collecting efficiency (%) |
|---|---|---|---|---|---|---|---|---|
| Comparative Example 12 | 34 | 0.7 | 1.4 | 7.6 | 0.7 | 7.3 | 8.3 | 91 |
| Comparative Example 13 | 36 | 0.7 | 4.0 | 7.6 | 0.7 | 7.8 | 7.6 | 90 |

(Results)

As shown in Table 3, all the honeycomb filters of Examples 1 to 17 had suitable results in the evaluations of the maximum amount of the soot to be deposited, the pressure loss and the collecting efficiency. On the other hand, as shown in Table 6, in the honeycomb filters of Comparative Examples 1 to 13, any one of the evaluations of the maximum amount of the soot to be deposited, the pressure loss and the collecting efficiency did not satisfy passable standards.

Figure 3:
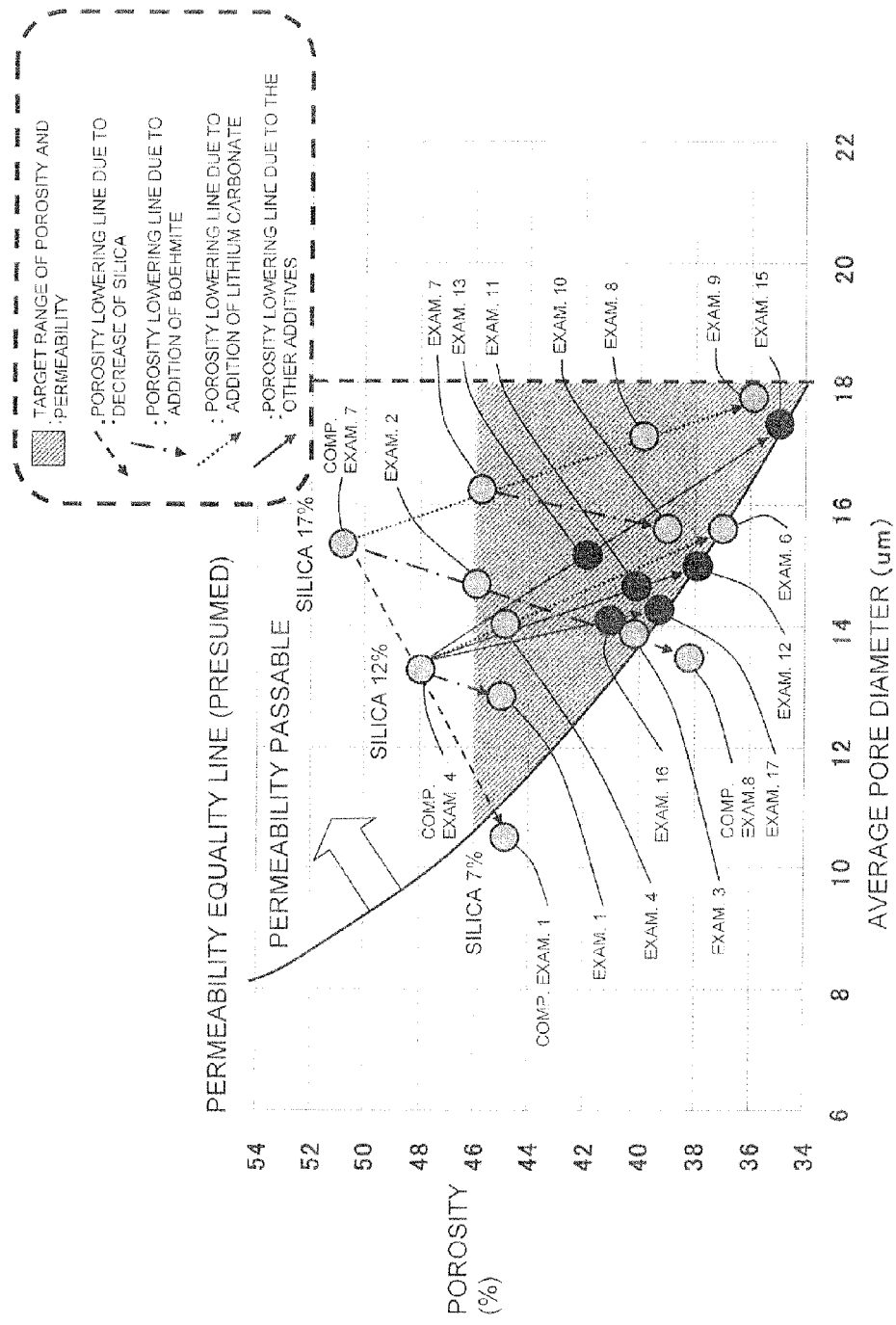
FIG. 3 is a graph showing a relation between an average pore diameter (μm) and a porosity (%) in honeycomb filters of Examples 1 to 4, 6 to 13 and 15 to 17 and Comparative Examples 1, 4, 7 and 8.

Here, FIG. 3 shows a relation between an average pore diameter (μm) and a porosity (%) in the honeycomb filters of Examples 1 to 4, 6 to 13 and 15 to 17 and Comparative Examples 1, 4, 7 and 8. FIG. 3 is a graph showing the relation between the average pore diameter (μm) and the porosity (%) in the honeycomb filters of Examples 1 to 4, 6 to 13 and 15 to 17 and Comparative Examples 1, 4, 7 and 8. In FIG. 3, the abscissa indicates the average pore diameter (μm). In FIG. 3, the ordinate indicates the porosity (%).

In the graph shown in FIG. 3, "a permeability equality line (presumed)" is drawn to a position where it is presumed that the permeabilities of the honeycomb filters are equal. That is, it is considered that the honeycomb filters which are present on this permeability equality line indicate an equal value of the permeability even when the filters have different porosities and different average pore diameters.

Moreover, in the graph shown in FIG. 3, as a porosity lowering line due to decrease of silica, a porosity lowering line due to addition of boehmite, a porosity lowering line due to addition of lithium carbonate and porosity lowering lines due to the other additives, lines with arrows are drawn. It is seen that the porosities of the partition walls lower in a direction indicated by each line. "The additives" in the porosity lowering lines due to the other additives are cerium oxide ($CeO_2$), zirconium oxide ($ZrO_2$) and yttrium oxide ($Y_2O_3$). A line drawn on Examples 11 and 12 is the porosity lowering line due to the addition of cerium oxide. A line drawn on Examples 13 and 15 is the porosity lowering line due to the addition of zirconium oxide. A line drawn on Examples 16 and 17 is the porosity lowering line due to the addition of zirconium oxide.

Furthermore, in the graph shown in FIG. 3, a target range of the porosity and permeability is shown as a hatched area. The target range of the porosity and permeability means the range which satisfies the values of the porosity and permeability in the honeycomb filter of the present invention.

Figure 4:
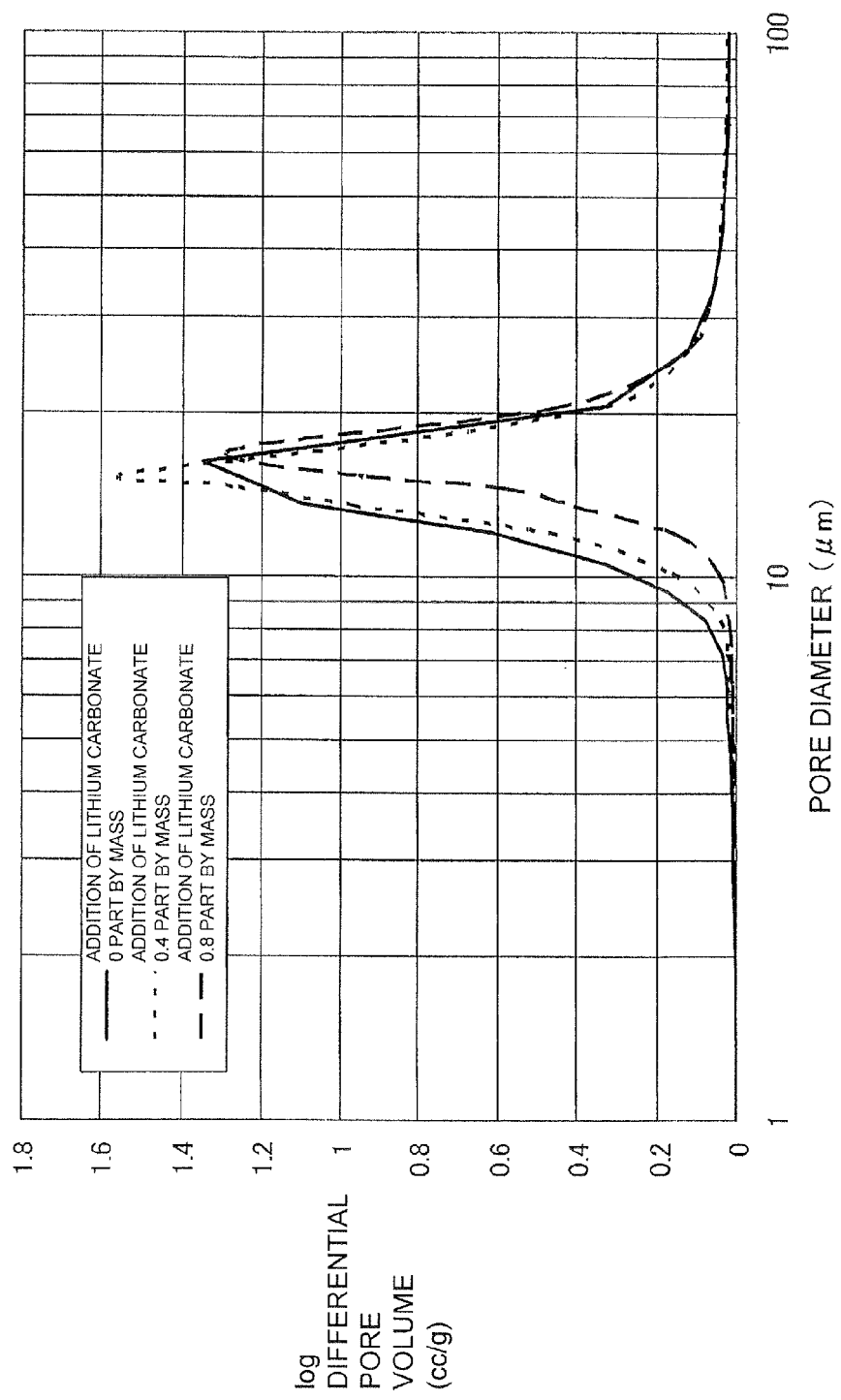
FIG. 4 is a graph showing pore diameter distributions of partition walls of a honeycomb structure for use in the honeycomb filter.

Moreover, FIG. 4 shows transitions of pore diameter distributions of the partition walls in a case where lithium carbonate is added to the forming raw material. FIG. 4 is a graph showing the pore diameter distributions of the partition walls of the honeycomb structure for use in the honeycomb filter. In FIG. 4, the abscissa indicates a pore diameter (μm). In FIG. 4, the ordinate indicates a log differential pore volume (cc/g). The graph shown in FIG. 4 indicates cases where addition ratios of lithium carbonate are 0 part by mass, 0.4 part by mass, and 0.8 part by mass. The addition ratio of lithium carbonate is a mass ratio of the amount of lithium carbonate to be added to 100 parts by mass of the cordierite forming raw material for use as the forming raw material.

From the graph shown in FIG. 4, it is seen that when lithium carbonate is added to the cordierite forming raw material, the distribution on a side on which the pore diameters are small in the pore diameter distributions of the partition walls decreases. On the other hand, as to the distribution on a side on which the pore diameters are large, any special change due to a difference in the addition ratio of lithium carbonate is not confirmed. From the graph shown in FIG. 4, it is seen that when lithium carbonate is added, an amount of the pores having the small pore diameters among the pores formed in the partition walls decreases. Such pores having the small pore diameters often do not extend from one surface to the other surface of each partition wall, and even when the pores having the small pore diameters decrease, the increase of the pressure loss of the honeycomb filter is not noticeably influenced. However, when the distribution on the side of the small pore diameter decreases, an amount of a dense portion of each partition wall increases. Therefore, it can be considered that a heat capacity of the honeycomb structure increases.

Figure 5:
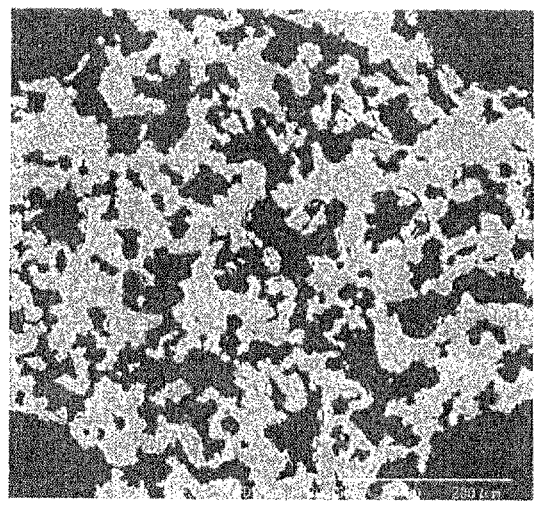
FIG. 5 is a microphotograph showing an enlarged cross section of the honeycomb filter which is cut perpendicularly to the cell extending direction.
Figure 6:
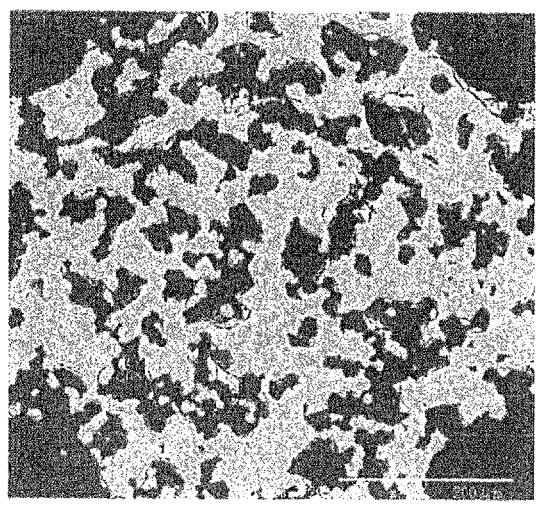
FIG. 6 is a microphotograph showing an enlarged cross section of the honeycomb filter which is cut perpendicularly to the cell extending direction.
Figure 7:
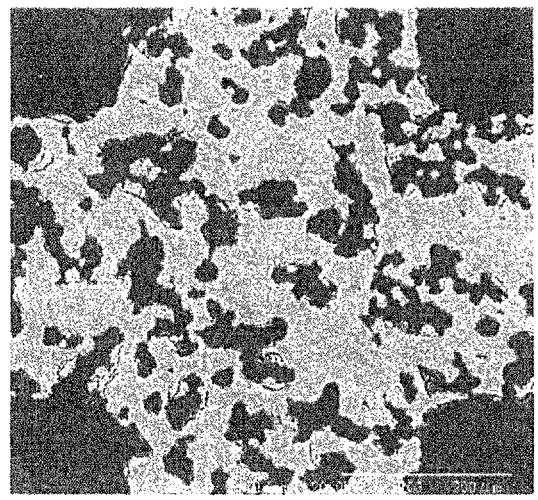
FIG. 7 is a microphotograph showing an enlarged cross section of the honeycomb filter which is cut perpendicularly to the cell extending direction.

Moreover, FIG. 5 to FIG. 7 are microphotographs each showing an enlarged cross section of the honeycomb filter which is cut perpendicularly to the cell extending direction. In FIG. 5, the honeycomb filter in which the addition ratio of lithium carbonate is 0 part by mass is photographed. In FIG. 6, the honeycomb filter in which the addition ratio of lithium carbonate is 0.4 part by mass is photographed. In FIG. 7, the honeycomb filter in which the addition ratio of lithium carbonate is 0.8 part by mass is photographed. Also from the microphotographs of FIG. 5 to FIG. 7, it is confirmed that lithium carbonate is added to the cordierite forming raw material, thereby decreasing the pores having the small pore diameters.

Consequently, in the honeycomb filter of the present invention, the pores which are not concerned with the gas permeability and which have the small pore diameters are selectively closed, so that increase of a pressure loss can be suppressed. Furthermore, since the pores which are not concerned with the gas permeability are selectively closed, the porosity of the honeycomb structure for use in the honeycomb filter lowers, and the heat capacity of the honeycomb filter increases. In consequence, the durability of the honeycomb filter can be enhanced, and the maximum amount of the soot to be deposited can be increased.

INDUSTRIAL APPLICABILITY

A honeycomb filter of the present invention can be used to purify an exhaust gas discharged from an internal combustion engine. In particular, the honeycomb filter can suitably be used to purify an exhaust gas discharged from a diesel engine.

A manufacturing method of the honeycomb filter of the present invention can be used as the manufacturing method of the honeycomb filter of the present invention.

DESCRIPTION OF REFERENCE NUMERALS

1: partition wall, 2: cell, 2a: inflow cell, 2b: outflow cell, 3: outer peripheral wall, 4: honeycomb structure, 5: plugged portion, 11: one end surface, 12: the other end surface, and 100: honeycomb filter.

The invention claimed is:

1. A honeycomb filter comprising:
a tubular honeycomb structure having porous partition walls with which there are formed a plurality of cells extending from one end surface to the other end surface to become through channels of a fluid, wherein the material that makes up the partition walls contains at least one of lithium, cerium, zirconium and yttrium; and
plugged portions arranged in one open end portion of each of the predetermined cells and the other open end portion of each of the remaining cells,
wherein porosities of the partition walls are 46% or less,
a pore volume ratio of pores having pore diameters of 40 μm or more is 7.5% or less, and a pore volume ratio of pores having pore diameters of 10 μm or less is 25% or less,
a permeability of the honeycomb structure is 0.8 μm$^2$ or more, and
a coefficient of thermal expansion of the honeycomb structure in a range of 40° C. to 800° C. is $1.0 \times 10^{-6}$/° C. or less.

2. The honeycomb filter according to claim 1,
wherein the material that makes up the partition walls contains cordierite as a main component, and
the partition walls contain therein 0.40 mass % or less of lithium in terms of $Li_2O$.

3. The honeycomb filter according to claim 1,
wherein the partition walls contain therein at least one selected from the group consisting of cerium oxide, zirconium oxide and yttrium oxide, a content ratio of cerium oxide is 3.0 mass % or less, a content ratio of zirconium oxide is 2.5 mass % or less, and a content ratio of yttrium oxide is 2.0 mass % or less.

4. The honeycomb filter according to claim 1, which is prepared by using a kneaded material obtained by adding 1.0 part by mass or less of lithium carbonate to 100 parts by mass of a cordierite forming raw material.

5. The honeycomb filter according to claim 1, which is prepared by using a kneaded material obtained by adding, to a cordierite forming raw material, at least one selected from the group consisting of cerium oxide, zirconium oxide and yttrium oxide,
wherein an amount of cerium oxide to be added to 100 parts by mass of the cordierite forming raw material is 3.0 parts by mass or less, an amount of zirconium oxide to be added to 100 parts by mass of the cordierite forming raw material is 2.5 parts by mass or less, and an amount of yttrium oxide to be added to 100 parts by mass of the cordierite forming raw material is 2.0 parts by mass or less.

6. The honeycomb filter according to claim 1, which is prepared by using a kneaded material obtained by using 2 mass % or more and 8 mass % or less of boehmite as an alumina source of a cordierite forming raw material.

7. A manufacturing method of a porous honeycomb filter comprising:
a kneaded material preparing step of preparing a kneaded material containing a cordierite forming raw material;
a formed honeycomb body preparing step of forming the kneaded material to obtain a formed honeycomb body;
a honeycomb structure preparing ep of firing the formed honeycomb body to obtain a porous honeycomb structure; and
a plugging step of arranging plugged portions in one open end portion of each of predetermined cells of the porous honeycomb structure and the other open end portion of each of remaining cells,
wherein the kneaded material preparing step includes at least one selected from the group consisting of an operation of adding 0.2 part by mass or more and 1.0 part by mass or less of lithium carbonate to 100 parts by mass of the cordierite forming raw material, an operation of adding 3.0 parts by mass or less of cerium oxide to 100 parts by mass of the cordierite forming raw material, an operation of adding 2.5 parts by mass or less of zirconium oxide to 100 parts by mass of the cordierite forming raw material, and an operation of adding 2.0 parts by mass or less of yttrium oxide to 100 parts by mass of the cordierite forming raw material.

8. The manufacturing method of the honeycomb filter according to claim 7,
wherein porosities of partition walls of the obtained honeycomb structure are 46% or less, a pore volume ratio of pores having pore diameters of 40 μm or more is 7.5% or less, a permeability of the honeycomb structure is 0.8 μm$^2$ or more, and a pore volume ratio of pores having pore diameters of 10 μm or less is 25% or less, and a coefficient of thermal expansion of the honeycomb structure in a range of 40 to 800° C. is $1.0 \times 10^{-6}$/° C. or less.

9. The honeycomb filter according to claim 2,
wherein the partition walls contain therein at least one selected from the group consisting of cerium oxide, zirconium oxide and yttrium oxide, a content ratio of cerium oxide is 3.0 mass % or less, a content ratio of zirconium oxide is 2.5 mass % or less, and a content ratio of yttrium oxide is 2.0 mass % or less.

10. The honeycomb filter according to claim 9, which is prepared by using a kneaded material obtained by adding 1.0 part by mass or less of lithium carbonate to 100 parts by mass of a cordierite forming raw material.

11. The honeycomb filter according to claim 10, which is prepared by using a kneaded material obtained by adding, to a cordierite forming raw material, at least one selected from the group consisting of cerium oxide, zirconium oxide and yttrium oxide,
wherein an amount of cerium oxide to be added to 100 parts by mass of the cordierite forming raw material is 3.0 parts by mass or less, an amount of zirconium oxide to be added to 100 parts by mass of the cordierite forming raw material is 2.5 parts by mass or less, and an amount of yttrium oxide to be added to 100 parts by mass of the cordierite forming raw material is 2.0 parts by mass or less.

12. The honeycomb filter according to claim 11, which is prepared by using a kneaded material obtained by using 2 mass % or more and 8 mass % or less of boehmite as an alumina source of a cordierite forming raw material.

* * * * *